(12) United States Patent
He et al.

(10) Patent No.: US 11,955,996 B2
(45) Date of Patent: Apr. 9, 2024

(54) SIGNAL PROCESSING CHIP AND COMMUNICATIONS DEVICE

(71) Applicant: Huawei Technologies Co., Ltd., Shenzhen (CN)

(72) Inventors: Xiaoyue He, Shenzhen (CN); Shengsen Wang, Wuhan (CN); Xinjia Tian, Chengdu (CN); Li Zhang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 14 days.

(21) Appl. No.: 17/489,031

(22) Filed: Sep. 29, 2021

(65) Prior Publication Data
US 2022/0021405 A1     Jan. 20, 2022

Related U.S. Application Data

(63) Continuation of application No. PCT/CN2020/081107, filed on Mar. 25, 2020.

(30) Foreign Application Priority Data

Apr. 11, 2019    (CN) ......................... 201910291040.9

(51) Int. Cl.
    *H04B 1/00*     (2006.01)
    *H01Q 1/22*     (2006.01)

(52) U.S. Cl.
    CPC ......... *H04B 1/0007* (2013.01); *H01Q 1/2291* (2013.01); *H04B 1/0028* (2013.01)

(58) Field of Classification Search
    CPC ..... H04W 88/06; H04W 84/12; H04W 88/08; H04W 72/0453; H04W 36/14;
(Continued)

(56) References Cited

U.S. PATENT DOCUMENTS 4,887,278 A * 12/1989 Gupta ..................... H04B 3/06
    375/219
2005/0041347 A1    2/2005 Khorram
(Continued)

FOREIGN PATENT DOCUMENTS

CN         1816181 A      8/2006
CN    101325752 A    12/2008
(Continued)

OTHER PUBLICATIONS

Bingxue, et al., "Research and Development of WLAN (Wireless Local Area Network) Chipset," China Integrated Circuit; Aug. 2003, with an English abstract, 7 pages.
(Continued)

*Primary Examiner* — Golam Sorowar
(74) *Attorney, Agent, or Firm* — Conley Rose, P.C.

(57) ABSTRACT

A signal processing chip includes: a receiving module, configured to receive a WLAN analog baseband signal from a baseband chip; an analog-to-digital conversion module, configured to convert the WLAN analog baseband signal into a WLAN digital baseband signal; a processing module, configured to process the WLAN digital baseband signal into a WLAN analog intermediate frequency signal; and a sending module, configured to send the WLAN analog intermediate frequency signal to a radio frequency processing apparatus.

20 Claims, 16 Drawing Sheets

(58) Field of Classification Search
CPC ............ H04W 16/14; H04W 72/0406; H04W 72/042; H04W 74/006; H04W 88/10; H04W 36/0027; H04W 36/0066; H04W 52/0229; H04W 74/06; H04W 76/16; H04W 8/245; H04W 4/50; H04W 72/048; H04W 72/085; H04W 88/02; H04W 24/08; H04W 24/10; H04W 28/04; H04W 52/028; H04W 52/243; H04W 52/36; H04W 52/367; H04W 72/044; H04W 16/18; H04W 24/02; H04W 4/80; H04B 1/005; H04B 1/40; H04B 1/0475; H04B 7/0413; H04B 1/525; H04B 1/406; H04B 1/18; H04B 2001/0425; H04B 1/123; H04B 1/0003; H04B 7/0404; H04B 7/0871; H04B 1/006; H04B 1/0064; H04B 1/10; H04B 1/28; H04B 1/001; H04B 1/0075; H04B 1/0082; H04B 1/109; H04B 7/0837; H04B 7/0848; H04B 1/0057; H04B 1/0483; H04B 1/1027; H04B 1/126; H04B 15/06; H04B 7/0417; H04B 7/0452; H04B 7/0695; H04B 7/2612; H04B 1/0007; H04L 27/0002; H04L 5/001; H04L 25/03343; H04L 27/0008; H04L 27/2626; H04L 5/0044; H04L 69/18; H04L 25/03; H04L 25/03828; H04L 1/0035; H04L 27/2601; H04L 5/0048; H04L 69/325; H04L 1/0003; H04L 25/06; H04L 27/0006; H04L 27/2613; H04L 27/38; H04L 5/06; H04L 27/152; H04L 27/20; H04L 27/3405; H04L 5/0007; H04L 5/0035; H04L 5/14; H04L 5/143; H04L 5/16; H04L 69/22; H04L 69/323; H04L 69/324; H04L 2027/0016

See application file for complete search history.

(56) References Cited

U.S. PATENT DOCUMENTS

| | | |
|---|---|---|
| 2006/0034366 A1 | 2/2006 | Schmidt et al. |
| 2006/0067429 A1 | 3/2006 | Beyer et al. |
| 2011/0222519 A1 | 9/2011 | Liao et al. |
| 2013/0064148 A1 | 3/2013 | Boo et al. |
| 2015/0139122 A1* | 5/2015 | Rimini ............... H04W 72/082 370/329 |
| 2015/0244548 A1* | 8/2015 | Weissman .......... H04B 17/0082 455/42 |
| 2015/0280946 A1* | 10/2015 | Sabouri ................ H04L 25/063 375/319 |
| 2015/0358073 A1 | 12/2015 | Zhan |
| 2016/0308641 A1 | 10/2016 | Zeng et al. |
| 2018/0219587 A1* | 8/2018 | Huo ........................ H04B 1/40 |
| 2022/0255572 A1* | 8/2022 | Huo ........................ H04B 1/16 |

FOREIGN PATENT DOCUMENTS

| | | |
|---|---|---|
| CN | 101494493 A | 7/2009 |
| CN | 101588653 A | 11/2009 |
| CN | 102118778 A | 7/2011 |
| CN | 102932073 A | 2/2013 |
| CN | 103580715 A | 2/2014 |
| CN | 104104630 A | 10/2014 |
| CN | 104955089 A | 9/2015 |
| CN | 106160758 A | 11/2016 |
| CN | 106788569 A | 5/2017 |
| CN | 106912056 A | 6/2017 |
| CN | 106992794 A | 7/2017 |
| CN | 108123684 A | 6/2018 |
| CN | 109450828 A | 3/2019 |
| EP | 3136508 A1 | 3/2017 |
| JP | 2016511959 A | 4/2016 |
| WO | 2017171647 A1 | 10/2017 |

OTHER PUBLICATIONS

Yang Shengjun, "TD-SCDMA/GSM Double-mode Total Integrated RF Transceiver Chip," Global Electronics China, Feb. 2007, with an English abstract, 3 pages.

* cited by examiner

SIGNAL PROCESSING CHIP AND COMMUNICATIONS DEVICE

CROSS-REFERENCE TO RELATED APPLICATIONS

This is a continuation of Int'l Patent App. No. PCT/CN2020/081107, filed on Mar. 25, 2020, which claims priority to Chinese Patent App. No. 201910291040.9, filed on Apr. 11, 2019, both of which are incorporated by reference.

FIELD

This disclosure relates to the field of communications technologies, and in particular, to a signal processing chip and a communications device.

BACKGROUND

In recent years, with development of a wireless local area network (WLAN) technology, a WLAN has attracted wide attention from the industry and the public. The WLAN can resolve a problem such as staff mobility or mobile office in an enterprise, and bring more convenience to staff in the enterprise.

The main components in the WLAN are a wireless access point (AP) and a wireless station (STA), or terminal. The wireless AP is referred to as an AP, and the wireless STA is referred to as a STA. The AP mainly serves as a bridge between a wireless network and a wired network, and usually has at least two network interfaces. One network interface is a wireless interface complying with the Institute of Electrical and Electronics Engineers (IEEE) 802.11 standard, and another network interface is an interface connected to the wired network. Generally, a wired interface is an Ethernet interface. The AP accesses the Ethernet through the Ethernet interface and is connected to the STA through the wireless interface. The AP performs data transmission with the STA through the wireless interface. A basic architecture mode of the AP is a network structure shown in FIG. 1. A physical layer of the wireless network uses a technology such as orthogonal frequency-division multiplexing (OFDM), multiple-input multiple-output (MIMO), or a smart antenna to increase a data transmission rate. As a quantity of MIMOs supported by the AP increases, a quantity of antennas also increases. Consequently, a volume of the AP becomes larger and power consumption of the AP becomes higher.

SUMMARY

This disclosure provides a signal processing chip and a communications device, to reduce a volume and power consumption of the communications device.

According to a first aspect, a signal processing chip includes: a receiving module configured to receive a WLAN analog baseband signal from a baseband chip; an analog-to-digital conversion module configured to convert the WLAN analog baseband signal into a WLAN digital baseband signal; a processing module configured to process the WLAN digital baseband signal into a WLAN analog intermediate frequency signal; and a sending module configured to send the WLAN analog intermediate frequency signal to a radio frequency processing apparatus.

The first aspect provides the signal processing chip, and the signal processing chip is configured to be integrated with the baseband chip into a baseband processing apparatus. In a downlink direction, the signal processing chip processes the WLAN analog baseband signal from the baseband chip into the WLAN analog intermediate frequency signal. Because the signal processing chip sends the WLAN analog intermediate frequency signal to the radio frequency processing apparatus, the baseband processing apparatus including the signal processing chip can be disposed separately and remotely from the radio frequency processing apparatus. Therefore, the baseband processing apparatus is deployed in an equipment room at a near end, and communicates, in a wired manner, with the radio frequency processing apparatus deployed at a remote end, thereby reducing a volume and power consumption of a device deployed at the remote end. In addition, the WLAN analog baseband signal from the baseband chip is first converted into the WLAN digital baseband signal, and then the baseband signal is processed into the intermediate frequency signal in a digital domain, to avoid generating a mirror signal in a frequency band of the WLAN analog intermediate frequency signal, and reduce interference.

In a possible design, the processing module includes: an intermediate frequency processing submodule configured to process the WLAN digital baseband signal into a WLAN digital intermediate frequency signal; and a digital-to-analog conversion submodule configured to convert the WLAN digital intermediate frequency signal into the WLAN analog intermediate frequency signal.

In a possible design, the intermediate frequency processing submodule is further configured to: perform digital up-conversion on the WLAN digital baseband signal, to obtain a WLAN digital intermediate frequency signal.

In a possible design, the intermediate frequency processing submodule is further configured to: perform digital up-conversion and at least one of the following processing: rate conversion, pre-equalization, and gain control processing on the WLAN digital baseband signal, to obtain the WLAN digital intermediate frequency signal.

In a possible design, the receiving module is further configured to receive control information from the baseband chip.

The processing module is further configured to generate a digital control signal based on the control information, and convert the digital control signal into an analog control signal.

The sending module is further configured to send the analog control signal to the radio frequency processing apparatus.

In a possible design, the processing module further includes a signal generation submodule.

The receiving module is further configured to receive control information from the baseband chip.

The signal generation submodule is configured to generate a digital control signal based on the control information.

The digital-to-analog conversion submodule is further configured to convert the digital control signal into an analog control signal.

The sending module is further configured to send the analog control signal to the radio frequency processing apparatus.

In a possible design, the processing module further includes a superimposition submodule.

The superimposition submodule is configured to superimpose the digital control signal on the WLAN digital intermediate frequency signal, to obtain a superimposed digital signal.

The digital-to-analog conversion submodule is further configured to convert the superimposed digital signal into an analog signal, where the analog signal includes the analog control signal and the WLAN analog intermediate frequency signal.

The sending module is further configured to send the analog signal to the radio frequency processing apparatus.

In a possible design, the signal processing chip further includes a power adjustment module.

The power adjustment module is configured to adjust power of the WLAN analog intermediate frequency signal before the WLAN analog intermediate frequency signal is sent.

The sending module is further configured to send, to the radio frequency processing apparatus, a WLAN analog intermediate frequency signal whose power is adjusted.

In a possible design, the signal processing chip and the radio frequency processing apparatus are connected through a twisted pair or a coaxial cable.

The sending module is further configured to send the WLAN analog intermediate frequency signal to the radio frequency processing apparatus through the twisted pair or the coaxial cable.

According to a second aspect, a signal processing chip includes: a receiving module configured to receive a WLAN analog intermediate frequency signal from a baseband processing apparatus; a processing module configured to process the WLAN analog intermediate frequency signal into a WLAN digital baseband signal; a digital-to-analog conversion module configured to convert the WLAN digital baseband signal into a WLAN analog baseband signal; and a sending module configured to send the WLAN analog baseband signal to a radio frequency chip.

The second aspect provides the signal processing chip, and the signal processing chip is configured to be integrated with the radio frequency chip into a radio frequency processing apparatus. In a downlink direction, the signal processing chip processes the WLAN analog intermediate frequency signal from the baseband processing apparatus into the WLAN analog baseband signal for the radio frequency chip to transmit through an air interface. Because an input signal of the signal processing chip is the WLAN analog intermediate frequency signal, the radio frequency processing apparatus including the signal processing chip can communicate, in a wired manner, with the baseband processing apparatus deployed in an equipment room at a near end, thereby reducing a volume and power consumption of a device that includes the radio frequency processing apparatus and that is deployed at a remote end. In addition, the WLAN analog intermediate frequency signal from the baseband processing apparatus is first processed into the WLAN digital baseband signal, and then the WLAN digital baseband signal is converted into the WLAN analog baseband signal. The baseband signal is first obtained in a digital domain, to avoid generating a mirror signal, and reduce interference.

In a possible design, the processing module includes: an analog-to-digital conversion submodule configured to convert the WLAN analog intermediate frequency signal into a WLAN digital intermediate frequency signal; and an intermediate frequency processing submodule configured to process the WLAN digital intermediate frequency signal into the WLAN digital baseband signal.

In a possible design, the intermediate frequency processing submodule is further configured to: perform digital down-conversion and filtering on the WLAN digital intermediate frequency signal, to obtain the WLAN digital baseband signal.

In a possible design, the intermediate frequency processing submodule is further configured to: perform digital down-conversion, filtering, and rate conversion on the WLAN digital intermediate frequency signal, to obtain the WLAN digital baseband signal.

In a possible design, the receiving module is further configured to receive an analog control signal from the baseband processing apparatus.

The processing module is further configured to convert the analog control signal into a digital control signal and obtain control information from the digital control signal.

The sending module is further configured to send the control information to the radio frequency chip.

In a possible design, the processing module further includes an obtaining submodule.

The receiving module is further configured to receive an analog control signal from the baseband processing apparatus.

The analog-to-digital conversion submodule is further configured to convert the analog control signal into a digital control signal.

The obtaining submodule is configured to obtain control information from the digital control signal.

The sending module is further configured to send the control information to the radio frequency chip.

In a possible design, the processing module further includes a filtering submodule.

The receiving module is further configured to receive an analog signal, where the analog signal includes the analog control signal and the WLAN analog intermediate frequency signal.

The analog-to-digital conversion submodule is further configured to convert the analog signal into a digital signal, where the digital signal includes the digital control signal and the WLAN digital intermediate frequency signal.

The filtering submodule is configured to perform filtering on the digital signal to obtain the digital control signal and the WLAN digital intermediate frequency signal.

In a possible design, the signal processing chip further includes a low noise amplification module.

The low noise amplification module is configured to perform low noise amplification on the WLAN analog intermediate frequency signal before the WLAN analog intermediate frequency signal is processed into the WLAN digital baseband signal.

The processing module is further configured to process, into the WLAN digital baseband signal, the WLAN analog intermediate frequency signal on which low noise amplification is performed.

In a possible design, the signal processing chip and the baseband processing apparatus are connected through a twisted pair or a coaxial cable.

The receiving module is further configured to receive the WLAN analog intermediate frequency signal through the twisted pair or the coaxial cable.

According to a third aspect, a signal processing chip includes: a receiving module configured to receive a WLAN analog baseband signal from a radio frequency chip; an analog-to-digital conversion module configured to convert the WLAN analog baseband signal into a WLAN digital baseband signal; a processing module configured to process the WLAN digital baseband signal into a WLAN analog intermediate frequency signal; and a sending module configured to send the WLAN analog intermediate frequency signal to a baseband processing apparatus.

The third aspect provides the signal processing chip, and the signal processing chip is configured to be integrated with the radio frequency chip into a radio frequency processing apparatus. In an uplink direction, the signal processing chip processes the WLAN analog baseband signal from the radio frequency chip into the WLAN analog intermediate frequency signal. Because the signal processing chip sends the WLAN analog intermediate frequency signal to the baseband processing apparatus, the radio frequency processing apparatus including the signal processing chip can be disposed remotely from the baseband processing apparatus. Therefore, the baseband processing apparatus is deployed in an equipment room at a near end, and communicates, in a wired manner, with the radio frequency processing apparatus deployed at a remote end, thereby reducing a volume and power consumption of a device deployed at the remote end. In addition, the WLAN analog baseband signal from the radio frequency chip is first converted into the WLAN digital baseband signal, and then the baseband signal is processed into the intermediate frequency signal in a digital domain, to avoid generating a mirror signal in a frequency band of the WLAN analog intermediate frequency signal, and reduce interference.

In a possible design, the processing module includes: an intermediate frequency processing submodule configured to process the WLAN digital baseband signal into a WLAN digital intermediate frequency signal; and a digital-to-analog conversion submodule configured to convert the WLAN digital intermediate frequency signal into the WLAN analog intermediate frequency signal.

In a possible design, the intermediate frequency processing submodule is further configured to: perform digital up-conversion on the WLAN digital baseband signal, to obtain the WLAN digital intermediate frequency signal.

In a possible design, the intermediate frequency processing submodule is further configured to: perform digital up-conversion and at least one of the following processing: rate conversion, pre-equalization, and gain control processing on the WLAN digital baseband signal, to obtain the WLAN digital intermediate frequency signal.

In a possible design, the processing module is further configured to obtain control information, generate a digital control signal based on the control information, and convert the digital control signal into an analog control signal.

The sending module is further configured to send the analog control signal to the baseband processing apparatus.

In a possible design, the processing module further includes a signal generation submodule.

The signal generation submodule is configured to obtain control information and generate a digital control signal based on the control information.

The digital-to-analog conversion submodule is further configured to convert the digital control signal into an analog control signal.

The sending module is further configured to send the analog control signal to the baseband processing apparatus.

In a possible design, the processing module further includes a superimposition submodule.

The superimposition submodule is configured to superimpose the digital control signal on the WLAN digital intermediate frequency signal, to obtain a superimposed digital signal.

The digital-to-analog conversion submodule is further configured to convert the superimposed digital signal into an analog signal, where the analog signal includes the analog control signal and the WLAN analog intermediate frequency signal.

The sending module is further configured to send the analog signal to the baseband processing apparatus.

In a possible design, the signal processing chip further includes a power adjustment module.

The power adjustment module is configured to adjust power of the WLAN analog intermediate frequency signal before the WLAN analog intermediate frequency signal is sent.

The sending module is further configured to send, to the baseband processing apparatus, a WLAN analog intermediate frequency signal whose power is adjusted.

In a possible design, the signal processing chip and the baseband processing apparatus are connected through a twisted pair or a coaxial cable.

The sending module is further configured to send the WLAN analog intermediate frequency signal to the baseband processing apparatus through the twisted pair or the coaxial cable.

According to a fourth aspect, a signal processing chip includes: a receiving module configured to receive a WLAN analog intermediate frequency signal from a radio frequency processing apparatus; a processing module configured to process the WLAN analog intermediate frequency signal into a WLAN digital baseband signal; a digital-to-analog conversion module configured to convert the WLAN digital baseband signal into a WLAN analog baseband signal; and a sending module configured to send the WLAN analog baseband signal to a baseband chip.

The fourth aspect provides the signal processing chip, and the signal processing chip is configured to be integrated with the baseband chip into a baseband processing apparatus. In an uplink direction, the signal processing chip processes the WLAN analog intermediate frequency signal from the radio frequency processing apparatus into the WLAN analog baseband signal and sends the WLAN analog baseband signal to the baseband chip. Because the signal processing chip receives the WLAN analog intermediate frequency signal from the radio frequency processing apparatus, the baseband processing apparatus including the signal processing chip can be disposed remotely from the radio frequency processing apparatus. Therefore, the baseband processing apparatus is deployed in an equipment room at a near end, and communicates, in a wired manner, with the radio frequency processing apparatus deployed at a remote end, thereby reducing a volume and power consumption of a device deployed at the remote end. In addition, the WLAN analog intermediate frequency signal from the radio frequency processing apparatus is first processed into the WLAN digital baseband signal, and then the WLAN digital baseband signal is converted into the WLAN analog baseband signal. The baseband signal is first obtained in a digital domain, to avoid generating a mirror signal, and reduce interference.

In a possible design, the processing module includes: an analog-to-digital conversion submodule configured to convert the WLAN analog intermediate frequency signal into a WLAN digital intermediate frequency signal; and an intermediate frequency processing submodule configured to process the WLAN digital intermediate frequency signal into the WLAN digital baseband signal.

In a possible design, the intermediate frequency processing submodule is further configured to: perform digital down-conversion and filtering on the WLAN digital intermediate frequency signal, to obtain the WLAN digital baseband signal.

In a possible design, the intermediate frequency processing submodule is further configured to: perform digital down-conversion, filtering, and rate conversion on the WLAN digital intermediate frequency signal, to obtain the WLAN digital baseband signal.

In a possible design, the receiving module is further configured to receive an analog control signal from the radio frequency processing chip.

The processing module is further configured to convert the analog control signal into a digital control signal and obtain control information from the digital control signal.

When processing the WLAN analog intermediate frequency signal into the WLAN digital baseband signal, the processing module is further configured to process the WLAN digital intermediate frequency signal into the WLAN digital baseband signal based on the control information.

In a possible design, the processing module further includes an obtaining submodule.

The receiving module is further configured to receive an analog control signal from the radio frequency processing chip.

The analog-to-digital conversion submodule is further configured to convert the analog control signal into a digital control signal.

The obtaining submodule is configured to obtain control information from the digital control signal.

The intermediate frequency processing submodule is further configured to process the WLAN digital intermediate frequency signal into the WLAN digital baseband signal based on the control information.

In a possible design, the processing module further includes a filtering submodule.

The receiving module is further configured to receive an analog signal, where the analog signal includes the analog control signal and the WLAN analog intermediate frequency signal.

The analog-to-digital conversion submodule is further configured to convert the analog signal into a digital signal, where the digital signal includes the digital control signal and the WLAN digital intermediate frequency signal.

The filtering submodule is configured to perform filtering on the digital signal to obtain the digital control signal and the WLAN digital intermediate frequency signal.

In a possible design, the signal processing chip further includes a low noise amplification module.

The low noise amplification module is configured to perform low noise amplification on the WLAN analog intermediate frequency signal before the WLAN analog intermediate frequency signal is processed into the WLAN digital baseband signal.

The processing module is further configured to process, into the WLAN digital baseband signal, the WLAN analog intermediate frequency signal on which low noise amplification is performed.

In a possible design, the signal processing chip and the radio frequency processing apparatus are connected through a twisted pair or a coaxial cable.

The receiving module is further configured to receive the WLAN analog intermediate frequency signal through the twisted pair or the coaxial cable.

According to a fifth aspect, a communications device includes a baseband processing apparatus, a radio frequency processing apparatus, and an antenna. The radio frequency processing apparatus is connected to both the baseband processing apparatus and the antenna.

The baseband processing apparatus includes a baseband chip and the signal processing chip in the first aspect.

The radio frequency processing apparatus includes a radio frequency chip and the signal processing chip in the second aspect.

The baseband chip is configured to input a WLAN analog baseband signal to the signal processing chip in the baseband processing apparatus.

The radio frequency chip is configured to convert the WLAN analog baseband signal output by the signal processing chip in the radio frequency processing apparatus into a WLAN radio frequency signal.

The antenna is configured to send the WLAN radio frequency signal.

The fifth aspect provides the communications device. The baseband processing apparatus in the communications device can be disposed remotely from the radio frequency processing apparatus, so that the baseband processing apparatus is deployed in an equipment room at a near end, and communicates, in a wired manner, with the radio frequency processing apparatus deployed at a remote end, thereby reducing a volume and power consumption of a device deployed at the remote end. In addition, the WLAN analog intermediate frequency signal from the radio frequency processing apparatus is first processed into the WLAN digital baseband signal, and then the WLAN digital baseband signal is converted into the WLAN analog baseband signal. The baseband signal is first obtained in a digital domain, to avoid generating a mirror signal, and reduce interference.

According to a sixth aspect, a communications device includes a baseband processing apparatus, a radio frequency processing apparatus, and an antenna. The radio frequency processing apparatus is connected to both the baseband processing apparatus and the antenna.

The radio frequency processing apparatus includes a radio frequency chip and the signal processing chip in the fourth aspect.

The baseband processing apparatus includes a baseband chip and the signal processing chip in the third aspect.

The antenna is configured to receive a WLAN radio frequency signal.

The radio frequency chip is configured to convert the WLAN radio frequency signal into a WLAN analog baseband signal, and output the WLAN analog baseband signal to the signal processing chip in the radio frequency processing apparatus.

The baseband chip is configured to perform baseband processing on the WLAN analog baseband signal input by the signal processing chip in the baseband processing apparatus.

The sixth aspect provides the communications device. The baseband processing apparatus in the communications device can be disposed remotely from the radio frequency processing apparatus, so that the baseband processing apparatus is deployed in an equipment room at a near end, and communicates, in a wired manner, with the radio frequency processing apparatus deployed at a remote end, thereby reducing a volume and power consumption of a device deployed at the remote end. In addition, the WLAN analog intermediate frequency signal from the radio frequency processing apparatus is first processed into the WLAN digital baseband signal, and then the WLAN digital baseband signal is converted into the WLAN analog baseband signal. The baseband signal is first obtained in a digital domain, to avoid generating a mirror signal, and reduce interference.

DETAILED DESCRIPTION

"At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one (piece) of the following" or a similar expression thereof means any combination of these items, including any combination of singular items (pieces) or plural of items (pieces). For example, at least one (piece) of a, b, or c may represent: a, b, c, a and b, a and c, b and c, or a, b, and c, where a, b, and c may be singular or plural.

Figure 1:
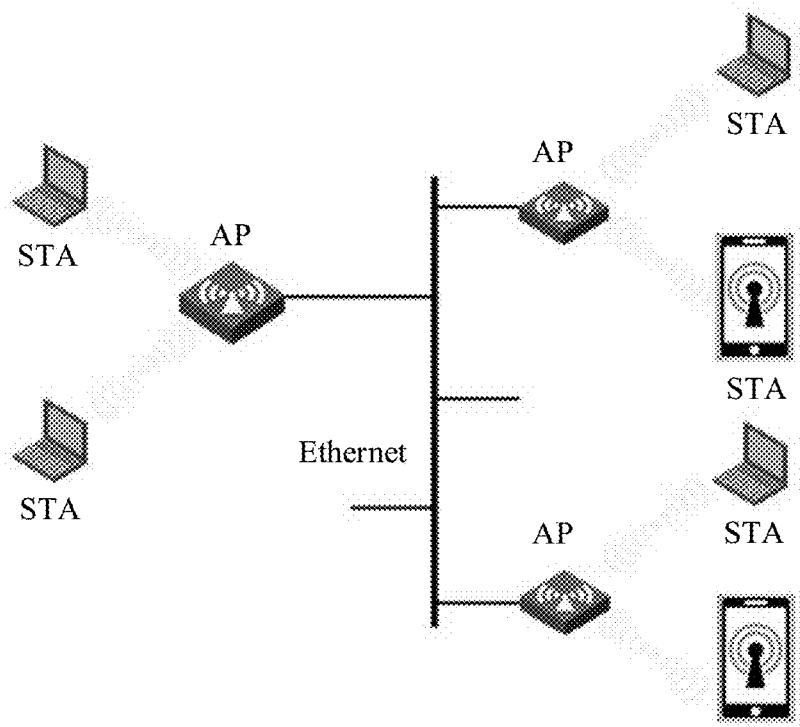
FIG. 1 is a schematic diagram of communication between an AP and a STA.
Figure 2:
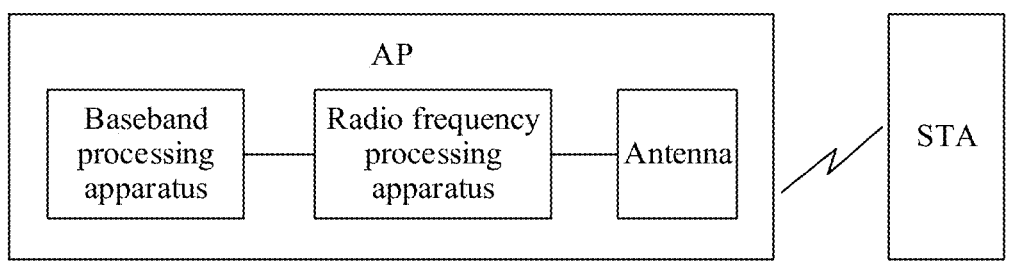
FIG. 2 is a schematic diagram of a communications system according to an embodiment.

FIG. 2 is a schematic diagram of a communications system according to an embodiment. As shown in FIG. 2, the communications system in this embodiment includes at least one AP, and each AP communicates with at least one STA.

The AP may include a baseband processing apparatus, a radio frequency processing apparatus, and an antenna. The baseband processing apparatus and the radio frequency processing apparatus are disposed separately, and the baseband processing apparatus and the radio frequency processing apparatus are connected in a wired manner. The AP may include at least one signal processing chip in the following embodiments.

Figure 3:
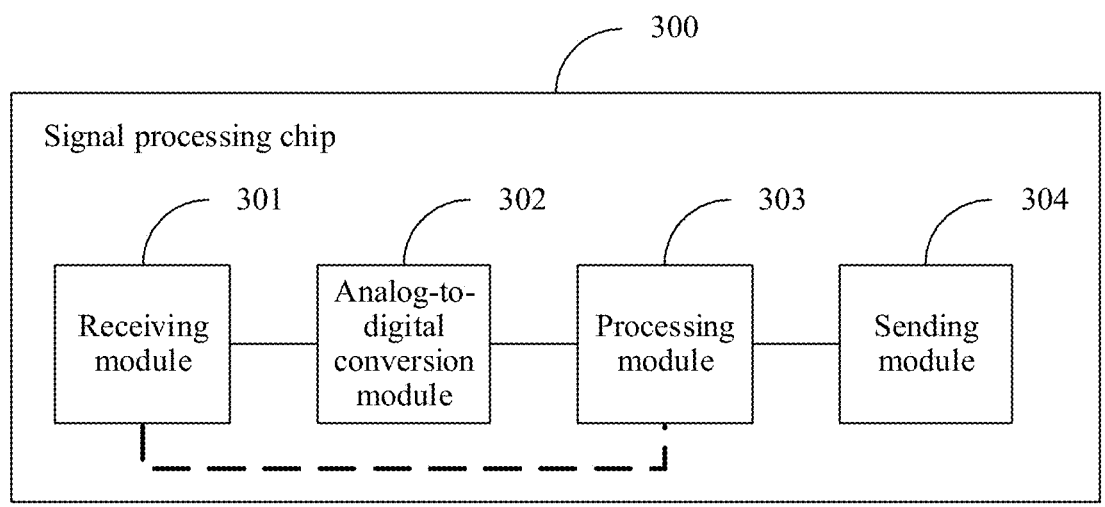
FIG. 3 is a schematic structural diagram of a signal processing chip according to an embodiment.

FIG. 3 is a schematic diagram of a signal processing chip according to an embodiment. As shown in FIG. 3, during application, a signal processing chip 300 in this embodiment may be included in the baseband processing apparatus in the AP shown in FIG. 2, and the baseband processing apparatus further includes a baseband chip. This embodiment is described from a perspective of a WLAN downlink direction. The signal processing chip 300 in this embodiment may include a receiving module 301, an analog-to-digital conversion module 302, a processing module 303, and a sending module 304.

In a first possible implementation, the receiving module 301 is configured to receive a WLAN analog baseband signal from the baseband chip.

The analog-to-digital conversion module 302 is configured to convert the WLAN analog baseband signal into a WLAN digital baseband signal.

The processing module 303 is configured to process the WLAN digital baseband signal into a WLAN analog intermediate frequency signal.

The sending module 304 is configured to send the WLAN analog intermediate frequency signal to a radio frequency processing apparatus.

In this embodiment, the baseband chip in the baseband processing apparatus may send the WLAN analog baseband signal to the signal processing chip 300. The baseband chip may be a WLAN baseband chip. Correspondingly, the receiving module 301 in the signal processing chip 300 may receive the WLAN analog baseband signal, and the receiving module 301 may be, for example, a communications interface of the signal processing chip 300. The analog-to-digital conversion module 302 performs analog-to-digital conversion on the WLAN analog baseband signal received by the receiving module 301, to obtain the WLAN digital baseband signal. The analog-to-digital conversion module 302 may be, for example, an analog-to-digital converter of the signal processing chip 300. The processing module 303 processes, into the WLAN analog intermediate frequency signal, the WLAN digital baseband signal obtained through conversion performed by the analog-to-digital conversion module 302. The sending module 304 sends, to the radio frequency processing apparatus, the WLAN analog intermediate frequency signal obtained through processing performed by the processing module 303. Optionally, a frequency band of the WLAN analog intermediate frequency signal is 20 megahertz (MHz) to 180 MHz. The WLAN analog intermediate frequency signal sent by the sending module 304 has specific transmit power, to ensure that the WLAN analog intermediate frequency signal received by the radio frequency processing apparatus has a specific signal-to-noise ratio, so that the radio frequency processing apparatus can correctly receive the WLAN analog intermediate frequency signal.

Based on the foregoing solution, the signal processing chip 300 sends the WLAN analog intermediate frequency signal to the radio frequency processing apparatus. The baseband processing apparatus including the signal processing chip 300 can be disposed remotely from the radio frequency processing apparatus. Therefore, the baseband processing apparatus is deployed in an equipment room at a near end, and communicates, in a wired manner (through a twisted pair or a coaxial cable), with the radio frequency processing apparatus deployed at a remote end, thereby reducing a volume and power consumption of a device deployed at the remote end. Further, in this embodiment, the WLAN analog baseband signal from the baseband chip is first converted into the WLAN digital baseband signal, and then the baseband signal is processed into the intermediate frequency signal in a digital domain, to avoid generating a mirror signal in the frequency band of the WLAN analog intermediate frequency signal, and reduce interference.

In some embodiments, because the signal processing chip 300 sends the WLAN analog intermediate frequency signal to the radio frequency processing apparatus, the signal processing chip 300 and the radio frequency processing apparatus may be connected through a twisted pair or a coaxial cable. Correspondingly, the sending module 304 is further configured to send the WLAN analog intermediate frequency signal to the radio frequency processing apparatus through the twisted pair or the coaxial cable. The twisted pair may be a twisted pair of a CAT5E, CAT6, or CAT6A cable. Therefore, using the twisted pair or the coaxial cable for connection can effectively reduce costs. Optionally, the signal processing chip 300 and the radio frequency processing apparatus may alternatively be connected through a coaxial cable.

In a second possible implementation, the receiving module 301 is configured to receive control information from the baseband chip.

The processing module 303 is configured to generate a digital control signal based on the control information, and convert the digital control signal into an analog control signal.

The sending module 304 is further configured to send the analog control signal to the radio frequency processing apparatus.

In this embodiment, the baseband chip sends the control information to the signal processing chip 300. Correspondingly, the receiving module 301 in the signal processing chip 300 receives the control information, and the processing module 303 generates the digital control signal based on the control information received by the receiving module 301. The processing module 303 (for example, which may be a digital-to-analog conversion submodule in the processing module 303) is further configured to convert the generated digital control signal into the analog control signal. Then, the sending module 304 sends the analog control signal to the radio frequency processing apparatus. The sending module 304 sends the analog control signal to the radio frequency processing apparatus in a wired manner (for example, through a twisted pair or a coaxial cable).

The control information may include at least one of the following: a clock signal, TDD switch information, radio frequency information, channel information, and power information. This is not limited in this embodiment.

It should be noted that the second possible implementation and the first possible implementation may be implemented independently, or the second possible implementation and the first possible implementation may be implemented in combination.

Figure 4:
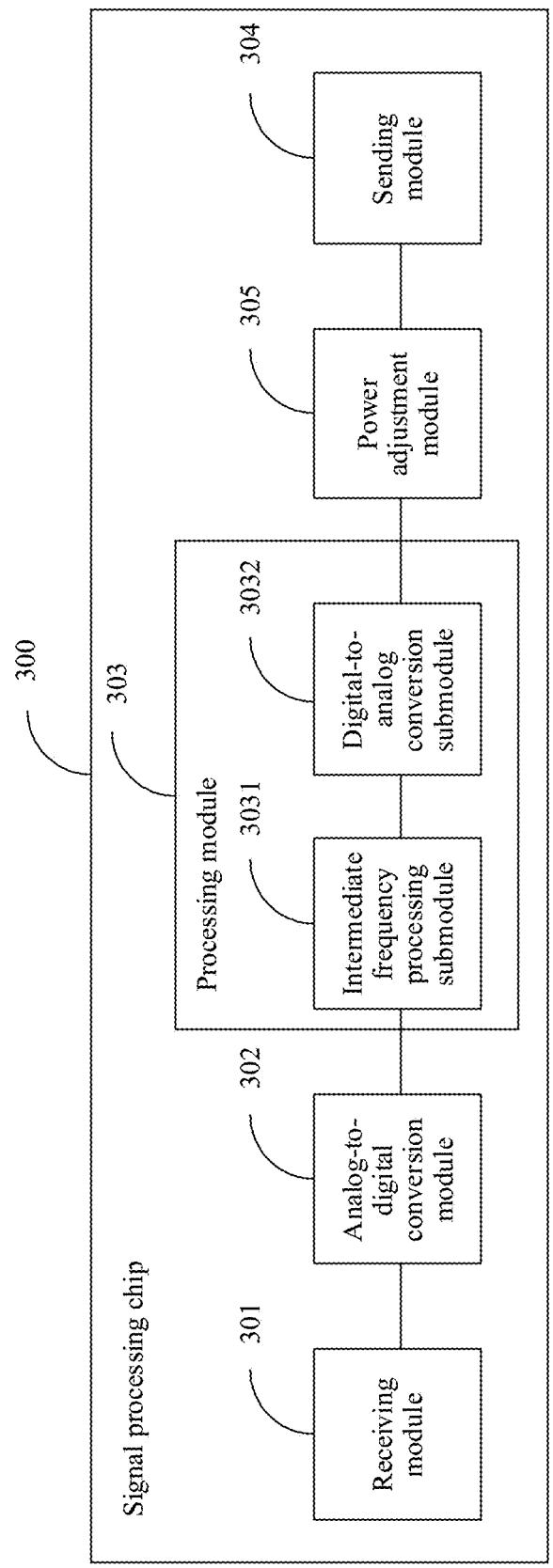
FIG. 4 is a schematic structural diagram of a signal processing chip according to another embodiment.

In some embodiments, as shown in FIG. 4, the processing module 303 may include an intermediate frequency processing submodule 3031 and a digital-to-analog conversion submodule 3032.

The intermediate frequency processing submodule 3031 is configured to process the WLAN digital baseband signal into a WLAN digital intermediate frequency signal.

The digital-to-analog conversion submodule 3032 is configured to convert the WLAN digital intermediate frequency signal into the WLAN analog intermediate frequency signal.

After the analog-to-digital conversion module 302 converts the WLAN analog baseband signal into the WLAN digital baseband signal, the intermediate frequency processing submodule 3031 in the processing module 303 processes, into the WLAN digital intermediate frequency signal, the WLAN digital baseband signal obtained through conversion performed by the analog-to-digital conversion module 302. Then, the digital-to-analog conversion submodule 3032 performs digital-to-analog conversion on the WLAN digital intermediate frequency signal obtained through processing performed by the intermediate frequency processing submodule 3031, to obtain the WLAN analog intermediate frequency signal. Therefore, in this embodiment, the WLAN digital baseband signal is converted into the WLAN digital intermediate frequency signal in a digital domain, and then the WLAN digital intermediate frequency signal in the digital domain is converted into the WLAN digital intermediate frequency signal in an analog domain, to avoid generating a mirror signal, and reduce interference.

In some embodiments, the intermediate frequency processing submodule 3031 is further configured to perform digital up-conversion on the WLAN digital baseband signal, to obtain the WLAN digital intermediate frequency signal. Optionally, the intermediate frequency processing submodule 3031 is further configured to perform digital up-conversion and at least one of the following processing: rate conversion, pre-equalization, and gain control processing on the WLAN digital baseband signal, to obtain the WLAN digital intermediate frequency signal.

In this embodiment, the analog-to-digital conversion module 302 samples the analog baseband signal based on a sampling rate. The sampling rate is at least a sampling rate that meets the Nyquist's sampling theorem. It is assumed that bandwidth of the WLAN analog baseband signal output by the baseband chip is BW Hz, the sampling rate $f_s \geq 2*BW$ of the analog-to-digital conversion module 302 may be many times of BW in an actual situation. Because the sampling rate of the analog-to-digital conversion module 302 may be very high, and an excessively high data flow brings difficulties in subsequent digital processing, the intermediate frequency processing submodule 3031 needs to perform rate conversion, for example, reduce the foregoing processing difficulty by reducing a rate. For example, it is assumed that the bandwidth of the WLAN analog baseband signal is 160 MHz, the sampling rate of the analog-to-digital conversion module 302 is 1280 MHz, and a signal rate of a digital up-converter (DUC) module is required to be 640 MHz. In this case, 2× decimation needs to be performed on the sampling rate. On the contrary, if the sampling rate during analog-to-digital (AD) conversion is excessively low, the intermediate frequency processing submodule 3031 also needs to perform rate conversion, for example, interpolation.

Figure 5:
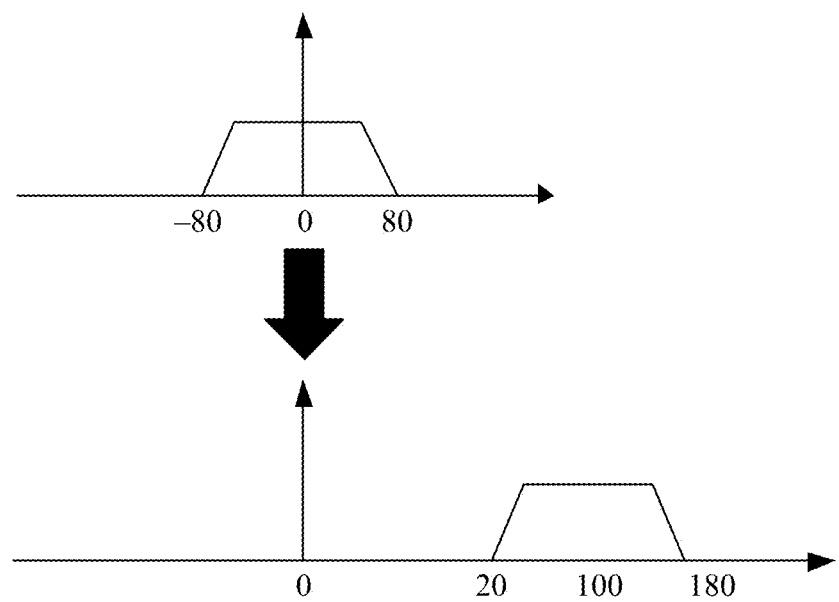
FIG. 5 is a schematic spectrum diagram of shifting a signal from a baseband to an intermediate frequency according to an embodiment.

If a rate of the digital baseband signal on which rate conversion is performed meets a requirement of the digital up-conversion, the intermediate frequency processing submodule 3031 performs digital up-conversion on the digital baseband signal on which rate conversion is performed, to obtain the digital intermediate frequency signal, thereby shifting the digital baseband signal from the baseband to an intermediate frequency. A schematic spectrum diagram is shown in FIG. 5.

A principle of the digital up-conversion is shown as follows:

$$[I+jQ][\cos\alpha+j\sin\alpha]=[I\cos\alpha-Q\sin\alpha]+j[I\sin\alpha+Q\cos\alpha]$$

A real-number signal of a real part or an imaginary part may be used as a signal on which digital up-conversion is performed.

Because the WLAN analog intermediate frequency signal sent by the sending module 304 in the signal processing chip 300 is transmitted to the radio frequency processing apparatus in a wired manner, pre-equalization is performed based on cable length estimation information of a cable to pre-compensate for un-flatness of wired transmission attenuation in frequency domain, so as to ensure that a signal-to-noise ratio (SNR) of each signal in a frequency band meets a requirement.

In a signal transmission process, attenuation of a high-frequency component of a signal is usually much greater than attenuation of a low-frequency component of the signal, and in an operating frequency band, attenuation of a relatively high-frequency signal is greater than attenuation of a relatively low-frequency signal. Therefore, before the WLAN analog intermediate frequency signal is sent to the radio frequency processing apparatus, excessive attenuation of a high-frequency component in a transmission process may be compensated for by performing pre-equalization on the digital intermediate frequency signal.

In this embodiment, gain control processing may be further performed on the digital intermediate frequency signal on which pre-equalization is performed, to ensure that target average power of the sent signal remains unchanged.

Optionally, the digital-to-analog conversion submodule 3032 converts the WLAN digital intermediate frequency signal into the WLAN analog intermediate frequency signal. Generally, the digital-to-analog conversion submodule 3032 needs to use an oversampling manner, to reduce design complexity of an analog reconstructed filter. Therefore, interpolation may need to be performed before the WLAN digital intermediate frequency signal is output to the digital-to-analog conversion submodule 3032. Then, after obtaining the WLAN analog intermediate frequency signal, the digital-to-analog conversion submodule 3032 may further perform power amplification on the WLAN analog intermediate frequency signal, so that the WLAN analog intermediate frequency signal meets a target transmit power requirement of a cable (for example, a twisted pair or a coaxial cable).

Optionally, as shown in FIG. 4, the signal processing chip 300 in this embodiment further includes a power adjustment module 305.

The power adjustment module 305 is configured to adjust power of the WLAN analog intermediate frequency signal before the WLAN analog intermediate frequency signal is sent.

The sending module 304 is further configured to send, to the radio frequency processing apparatus, a WLAN analog intermediate frequency signal whose power is adjusted.

After the processing module 303 processes the WLAN digital baseband signal into the WLAN analog intermediate frequency signal, the power adjustment module 305 adjusts the power of the WLAN analog intermediate frequency signal, and then the sending module 304 sends the WLAN analog intermediate frequency signal whose power is adjusted to the radio frequency processing apparatus. For example, the power adjustment module 305 performs power amplification on the WLAN analog intermediate frequency signal, so that the WLAN analog intermediate frequency signal meets the target transmit power requirement of the cable (for example, a twisted pair or a coaxial cable).

Figure 6:
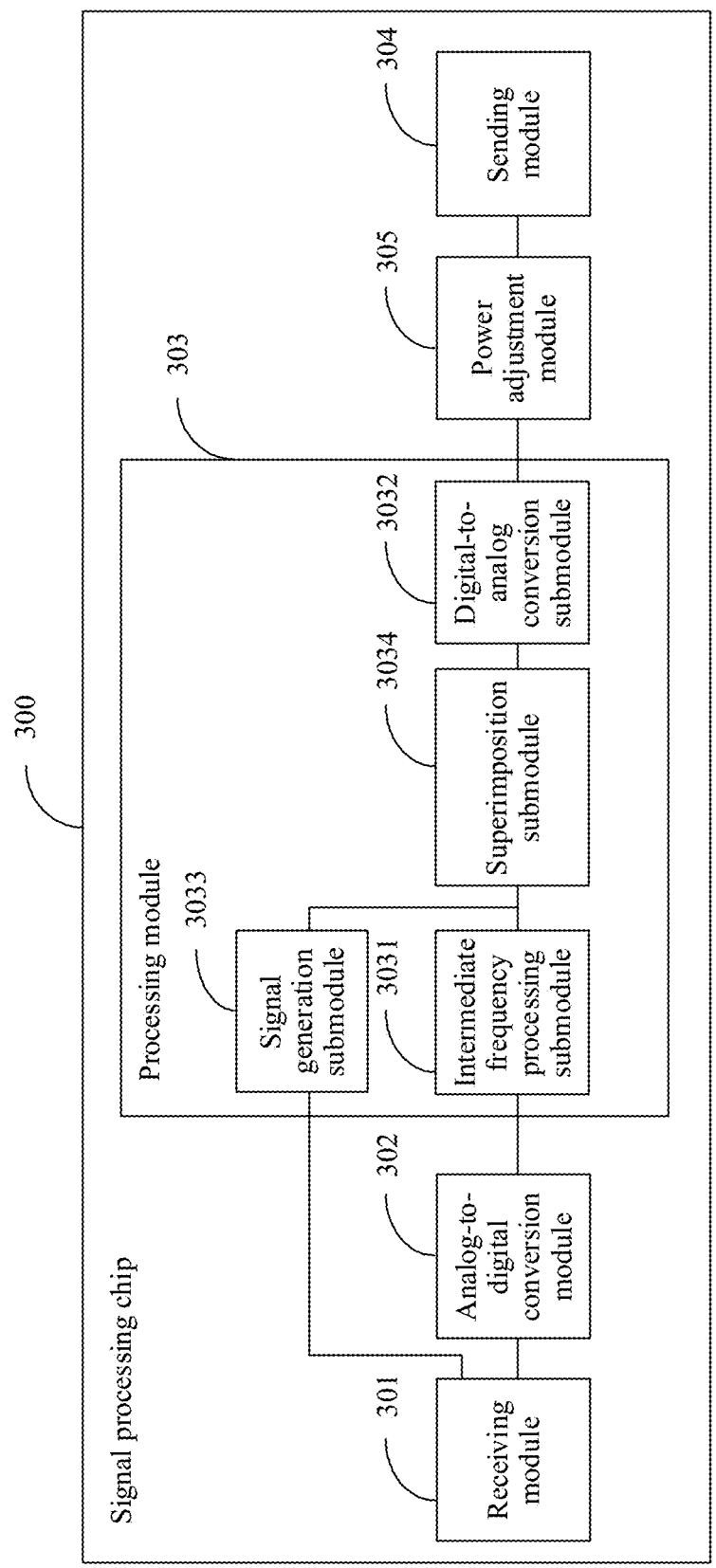
FIG. 6 is a schematic structural diagram of a signal processing chip according to another embodiment.

In some embodiments, as shown in FIG. 6, the processing module 303 in the signal processing chip 300 may further include a signal generation submodule 3033.

The receiving module 301 is further configured to receive control information from the baseband chip.

The signal generation submodule 3033 is configured to generate a digital control signal based on the control information.

The digital-to-analog conversion submodule 3032 is further configured to convert the digital control signal into an analog control signal.

The sending module 304 is further configured to send the analog control signal to the radio frequency processing apparatus.

In this embodiment, the baseband chip further sends the control information to the signal processing chip 300. Correspondingly, the receiving module 301 in the signal processing chip 300 receives the control information, the signal generation submodule 3033 generates the digital control signal based on the control information received by the receiving module 301, and outputs the digital control signal to the digital-to-analog conversion submodule 3032, and the digital-to-analog conversion submodule 3032 may convert the digital control signal generated by the signal generation submodule 3033 into the analog control signal. Then, the sending module 304 sends the analog control signal to the radio frequency processing apparatus. The sending module 304 may send the analog control signal to the radio frequency processing apparatus in a wired manner (for example, through a twisted pair or a coaxial cable).

Optionally, before the sending module 304 sends the analog control signal, the power adjustment module 305 adjusts power of the analog control signal, and the sending module 304 sends an analog control signal whose power is adjusted.

The control information may include at least one of the following: a time-division duplex (time division duplexing, TDD) switch signal, WLAN channel information, radio frequency information, clock information, transmit power information, internet of things (TOT) data information, and the like. This is not limited in this embodiment.

In some embodiments, as shown in FIG. 6, the processing module 303 further includes a superimposition submodule 3034.

The superimposition submodule 3034 is configured to superimpose the digital control signal on the WLAN digital intermediate frequency signal, to obtain a superimposed digital signal.

The digital-to-analog conversion submodule 3032 is further configured to convert the superimposed digital signal into an analog signal, where the analog signal includes the analog control signal and the WLAN analog intermediate frequency signal.

The sending module 304 is further configured to send the analog signal to the radio frequency processing apparatus.

In this embodiment, after the signal generation submodule 3033 generates the digital control signal, the superimposition submodule 3034 in the processing module 303 obtains both the WLAN digital intermediate frequency signal from the intermediate frequency processing submodule 3031 and the digital control signal from the signal generation submodule 3033, and superimposes the WLAN digital intermediate frequency signal on the digital control signal, to obtain the superimposed digital signal. Then, the digital-to-analog conversion submodule 3032 obtains the superimposed digital signal from the superimposition submodule 3034, and performs digital-to-analog conversion on the superimposed digital signal, to obtain the analog signal, where the analog signal includes the analog control signal and the WLAN analog intermediate frequency signal. Then, the sending module 304 sends the analog signal to the radio frequency processing apparatus. The sending module 304 may send the analog control signal to the radio frequency processing apparatus in a wired manner (for example, through a twisted pair or a coaxial cable).

Optionally, the signal generation submodule 3033 may perform OOK or FSK modulation on the control information from the baseband chip and modulate to a low frequency (attenuation at a low frequency is small and reliability is high), and then perform interpolation to obtain the digital control signal, so that a sampling rate of the digital control signal is consistent with that of the WLAN digital intermediate frequency signal. The superimposition submodule 3034 may superimpose the digital control signal on the WLAN digital intermediate frequency signal, then the digital-to-analog conversion submodule 3032 performs digital-to-analog conversion, and the sending module 304 sends a signal obtained through superimposition and digital-to-analog conversion.

Optionally, before the sending module 304 sends the analog signal, the power adjustment module 305 adjusts power of the analog signal, and the sending module 304 sends an analog signal whose power is adjusted.

In the foregoing embodiments, the signal processing chip 300 may be connected to an interface such as a high-speed input (HSI) interface, a serial peripheral interface (SPI), or a general-purpose input/output (GPIO) interface of the baseband chip, so that the receiving module 301 receives the control information and/or the WLAN digital baseband signal from the baseband chip.

Figure 7:
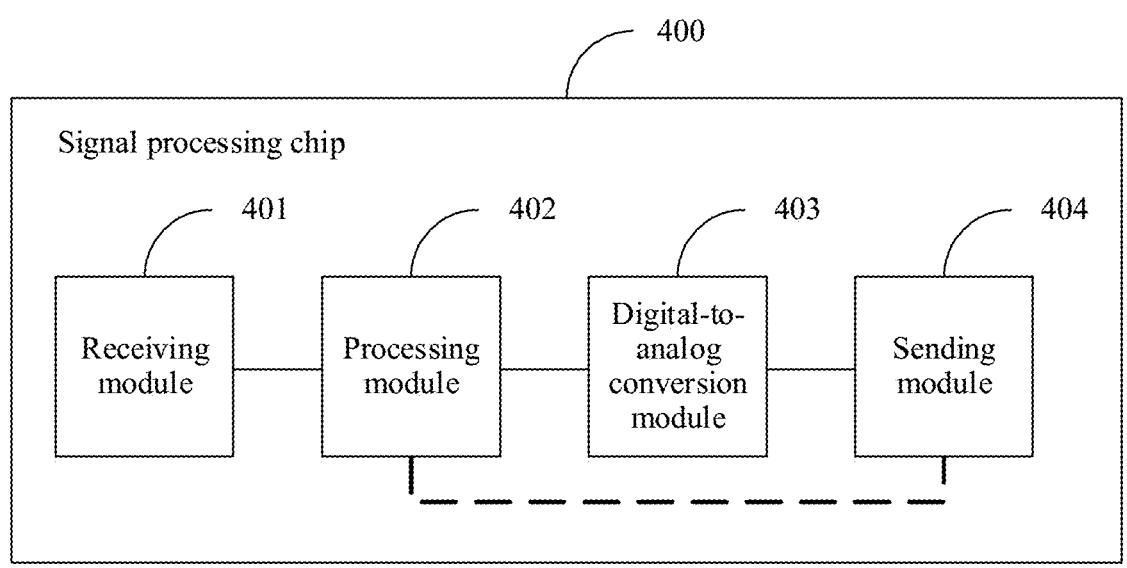
FIG. 7 is a schematic structural diagram of a signal processing chip according to another embodiment.

FIG. 7 is a schematic diagram of a signal processing chip according to another embodiment. As shown in FIG. 7, during application, a signal processing chip 400 in this embodiment may be included in the radio frequency processing apparatus in the AP shown in FIG. 2, and the radio frequency processing apparatus further includes a radio frequency chip. This embodiment is described from a perspective of a WLAN downlink direction. The signal processing chip 400 in this embodiment may include a receiving module 401, a processing module 402, a digital-to-analog conversion module 403, and a sending module 404.

In a first possible implementation, the receiving module 401 is configured to receive a WLAN analog intermediate frequency signal from a baseband processing apparatus (for example, the signal processing chip 300 in the foregoing embodiments).

The processing module 402 is configured to process the WLAN analog intermediate frequency signal into a WLAN digital baseband signal.

The digital-to-analog conversion module 403 is configured to convert the WLAN digital baseband signal into a WLAN analog baseband signal.

The sending module 404 is configured to send the WLAN analog baseband signal to the radio frequency chip.

In this embodiment, the baseband processing apparatus sends the WLAN analog intermediate frequency signal to the signal processing chip 400, where a frequency band of the WLAN analog intermediate frequency signal is, for example, 20 MHz to 180 MHz. Correspondingly, the receiving module 401 in the signal processing chip 400 may receive the WLAN analog intermediate frequency signal, and the receiving module 401 may be, for example, a communications interface of the signal processing chip 400. The processing module 402 processes the WLAN analog intermediate frequency signal received by the receiving module 401 into the WLAN digital baseband signal. The digital-to-analog conversion module 403 performs digital-to-analog conversion on the WLAN digital baseband signal obtained through processing performed by the processing module 402, to obtain the WLAN analog baseband signal. The digital-to-analog conversion module 403 may be, for example, a digital-to-analog converter of the signal processing chip 400. The sending module 404 sends, to the radio frequency chip, the WLAN analog baseband signal obtained by the digital-to-analog conversion module 403. After obtaining the WLAN analog baseband signal, the radio frequency chip performs operations such as radio frequency amplification and radio frequency filtering on the WLAN analog baseband signal, and then sends, through an antenna, the WLAN analog baseband signal on which the operations are performed.

Based on the foregoing solution, because the signal processing chip 400 receives the WLAN analog intermediate frequency signal sent by the baseband processing apparatus, the radio frequency processing apparatus including the signal processing chip 400 can be disposed remotely from the baseband processing apparatus. Therefore, the baseband processing apparatus is deployed in an equipment room at a near end, and communicates, in a wired manner, with the radio frequency processing apparatus deployed at a remote end, thereby reducing a volume and power consumption of a device deployed at the remote end. In addition, in this embodiment, the WLAN analog intermediate frequency signal from the baseband processing apparatus is first processed into the WLAN digital baseband signal, and then the WLAN digital baseband signal is converted into the WLAN analog baseband signal. In this embodiment, the baseband signal is first obtained in a digital domain, to avoid generating a mirror signal, and reduce interference.

In some embodiments, because the signal processing chip 400 receives the WLAN analog intermediate frequency signal from the baseband processing apparatus, the signal processing chip 400 and the baseband processing apparatus may be connected through a twisted pair or a coaxial cable. Correspondingly, the receiving module 401 is further configured to receive the WLAN analog intermediate frequency signal through the twisted pair or the coaxial cable. Therefore, using the twisted pair or the coaxial cable for connection can effectively reduce costs.

In a second possible implementation, the receiving module 401 is configured to receive an analog control signal from the baseband processing apparatus.

The processing module 402 is configured to convert the analog control signal into a digital control signal and obtain control information from the digital control signal.

The sending module 404 is further configured to send the control information to the radio frequency chip.

In this embodiment, the baseband processing apparatus further sends the analog control signal to the signal processing chip 400. Correspondingly, the receiving module 401 in the signal processing chip 400 receives the analog control signal. The processing module 402 (for example, an analog-to-digital conversion submodule in the processing module 402) performs analog-to-digital conversion on the analog control signal received by the receiving module 401 to obtain the digital control signal, and then obtains the control information from the obtained digital control signal. Then, the sending module 404 sends the control information to the radio frequency chip. The receiving module 401 may receive the analog control signal in a wired manner (for example, through a twisted pair or a coaxial cable). After the radio frequency chip receives the control information, a control unit such as a central processing unit (CPU), a single-chip microcomputer, or an FPGA inside the radio frequency chip controls the radio frequency chip based on the control information. Optionally, the control unit such as the CPU, the single-chip microcomputer, or the field-programmable gate array (FPGA) may be a unit externally mounted on the radio frequency chip.

After the receiving module 401 receives the analog control signal, the processing module 402 samples the analog control signal. A sampling rate is at least a sampling rate that meets the Nyquist's sampling theorem. Therefore, after performing analog-to-digital conversion on the analog control signal, the processing module 402 needs to perform rate conversion. For example, if a rate is excessively high, rate reduction (for example, decimation is performed); or if a rate is excessively low, interpolation is performed.

Because a frequency band of the digital control signal is below a frequency (for example, below 20 MHz), a rate of the digital control signal may be reduced through decimation, and then the control information is obtained from a decimated digital control signal.

The control information may include at least one of the following: a TDD switch signal, WLAN channel information, radio frequency information, clock information, transmit power information, IOT data information, and the like. This is not limited in this embodiment.

The clock signal is used to perform tracking and compensation on a clock after clock synchronization calculation.

It should be noted that the second possible implementation and the first possible implementation may be implemented independently, or the second possible implementation and the first possible implementation may be implemented in combination.

Figure 8:
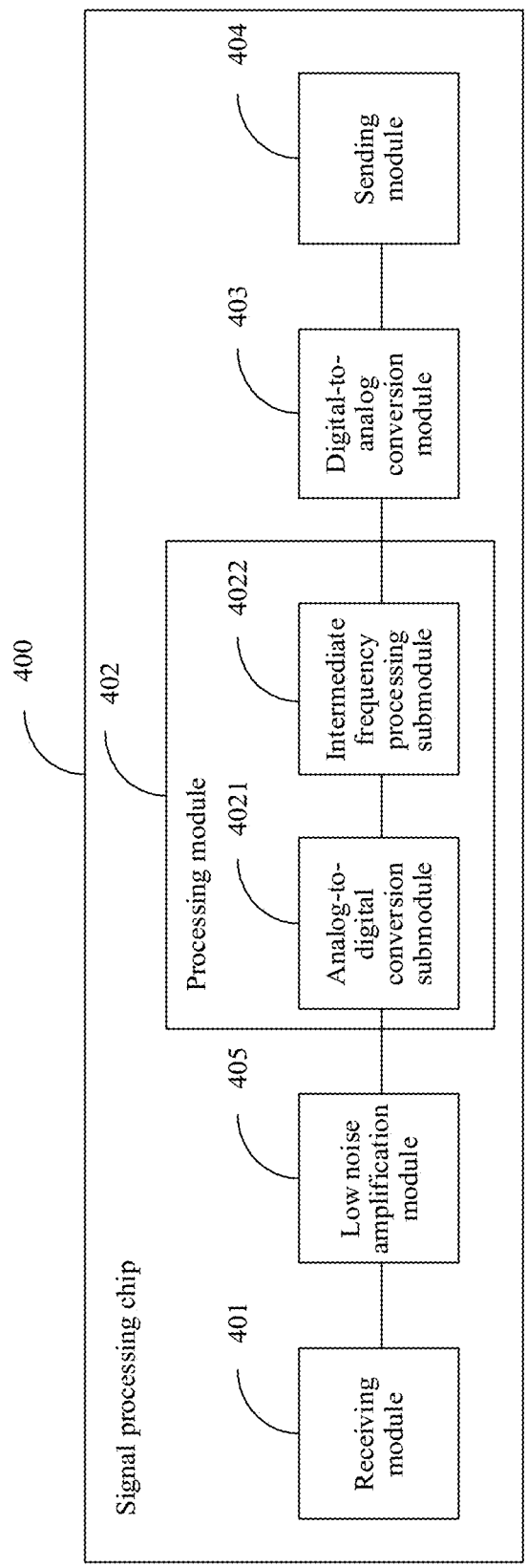
FIG. 8 is a schematic structural diagram of a signal processing chip according to another embodiment.

In some embodiments, as shown in FIG. 8, the processing module 402 may include an analog-to-digital conversion submodule 4021 and an intermediate frequency processing submodule 4022.

The analog-to-digital conversion submodule 4021 is configured to convert the WLAN analog intermediate frequency signal into a WLAN digital intermediate frequency signal.

The intermediate frequency processing submodule 4022 is configured to process the WLAN digital intermediate frequency signal into the WLAN digital baseband signal.

After the receiving module 401 receives the WLAN analog intermediate frequency signal, the analog-to-digital conversion submodule 4021 in the processing module 402 performs analog-to-digital conversion on the WLAN analog intermediate frequency signal, to obtain the WLAN digital intermediate frequency signal. Then, the intermediate frequency processing submodule 4022 processes, into the WLAN digital baseband signal, the WLAN digital intermediate frequency signal obtained by the analog-to-digital conversion submodule 4021. Therefore, in this embodiment, conversion is first performed from an analog domain to a digital domain, and then the WLAN digital intermediate frequency signal is converted in the digital domain into the WLAN digital baseband signal, to avoid generating a mirror signal, and reduce interference.

In some embodiments, the intermediate frequency processing submodule 4022 is further configured to perform digital down-conversion and filtering on the WLAN digital intermediate frequency signal, to obtain the WLAN digital baseband signal. Optionally, the intermediate frequency processing submodule 4022 is further configured to perform digital down-conversion, filtering, and rate conversion on the WLAN digital intermediate frequency signal, to obtain the WLAN digital baseband signal.

In this embodiment, the intermediate frequency processing submodule 4022 performs digital down-conversion on the WLAN digital intermediate frequency signal, that is, shifts the WLAN digital intermediate frequency signal from an intermediate frequency to a baseband. Then, the intermediate frequency processing submodule 4022 performs filtering on the signal that is shifted to the baseband, to filter out a new frequency component generated in a spectrum shifting process.

In addition, generally, the digital-to-analog conversion module 403 needs to convert the WLAN digital baseband signal into the WLAN analog baseband signal in an oversampling manner, to reduce design complexity of an analog reconstructed filter. Therefore, before the WLAN digital baseband signal is output to the digital-to-analog conversion module 403 for digital-to-analog conversion, rate conversion (for example, interpolation) may need to be performed. Correspondingly, the digital-to-analog conversion module 403 performs digital-to-analog conversion on a WLAN digital baseband signal obtained through rate conversion.

Optionally, after the receiving module 401 receives the WLAN analog intermediate frequency signal, the analog-to-digital conversion submodule 4021 samples the WLAN analog intermediate frequency signal. A sampling rate is at least a sampling rate that meets the Nyquist's sampling theorem. It is assumed that a highest frequency for transmitting a WLAN intermediate frequency signal on a twisted pair or a coaxial cable is $f_H$ Hz, and a sampling rate is $f_s \geq 2*f_H$.

In an actual situation, $f_s$ may be very high, and an excessively high data flow brings difficulties in subsequent processing. Therefore, rate conversion (for example, rate reduction) is required to reduce the processing difficulty. On the contrary, interpolation needs to be performed to match a processing rate of a subsequent module.

In some embodiments, the signal processing chip 400 further includes a low noise amplification module 405.

The low noise amplification module 405 is configured to perform low noise amplification on the WLAN analog intermediate frequency signal before the WLAN analog intermediate frequency signal is processed into the WLAN digital baseband signal.

The processing module 402 is further configured to process, into the WLAN digital baseband signal, the WLAN analog intermediate frequency signal on which low noise amplification is performed.

In this embodiment, the low noise amplification module 405 performs low noise amplification on the WLAN analog intermediate frequency signal received by the receiving module 401, to obtain the WLAN analog intermediate frequency signal on which low noise amplification is performed. Then, the processing module 402 processes, into the WLAN digital baseband signal, the WLAN analog intermediate frequency signal on which low noise amplification is performed.

Figure 9:
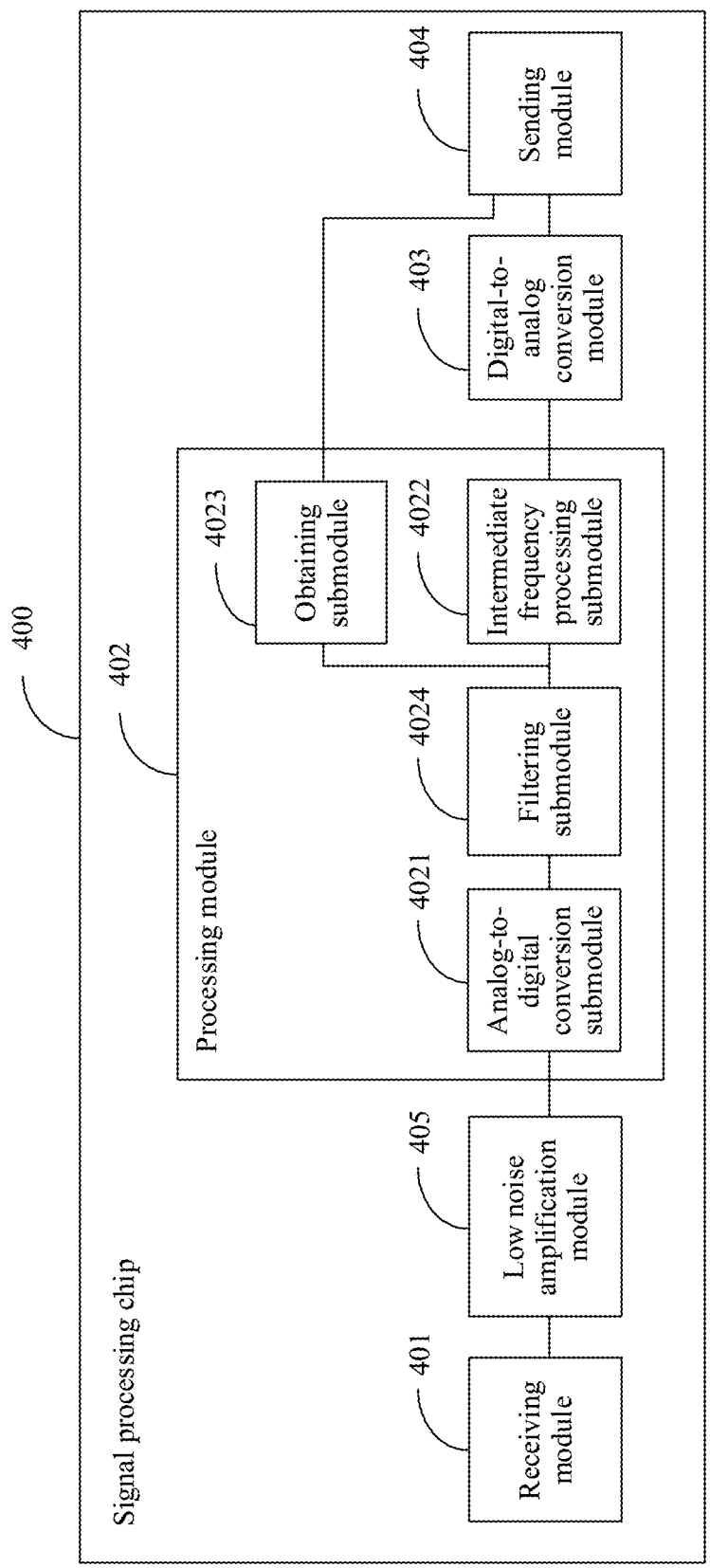
FIG. 9 is a schematic structural diagram of a signal processing chip according to another embodiment.

In some embodiments, as shown in FIG. 9, the processing module 402 in the signal processing chip 400 may further include an obtaining submodule 4023.

The receiving module 401 is further configured to receive an analog control signal from the baseband processing apparatus.

The analog-to-digital conversion submodule 4021 is further configured to convert the analog control signal into a digital control signal.

The obtaining submodule 4023 is configured to obtain control information from the digital control signal.

The sending module 404 is further configured to send the control information to the radio frequency chip.

In this embodiment, the baseband processing apparatus further sends the analog control signal to the signal processing chip 400. Correspondingly, the receiving module 401 in the signal processing chip 400 receives the analog control signal. The analog-to-digital conversion submodule 4021 in the processing module 402 performs analog-to-digital conversion on the analog control signal received by the receiving module 401, to obtain the digital control signal. The obtaining submodule 4023 obtains the control information from the digital control signal obtained by the analog-to-digital conversion submodule 4021. Then, the sending module 404 sends the control information to the radio frequency chip. The receiving module 401 receives the analog control signal in a wired manner (for example, through a twisted pair or a coaxial cable).

In some embodiments, as shown in FIG. 9, the processing module 402 further includes a filtering submodule 4024.

The receiving module 401 is further configured to receive an analog signal, where the analog signal includes the analog control signal and the WLAN analog intermediate frequency signal.

The analog-to-digital conversion submodule 4021 is further configured to convert the analog signal into a digital signal, where the digital signal includes the digital control signal and the WLAN digital intermediate frequency signal.

The filtering submodule 4024 is configured to perform filtering on the digital signal to obtain the digital control signal and the WLAN digital intermediate frequency signal.

In this embodiment, the receiving module 401 receives the analog signal from the baseband processing apparatus. The analog signal includes the WLAN analog intermediate frequency signal and the analog control signal. The analog-to-digital conversion submodule 4021 performs analog-to-digital conversion on the analog signal received by the receiving module 401, to obtain the digital signal. The analog signal includes the WLAN analog intermediate frequency signal and the analog control signal, and the digital signal obtained through analog-to-digital conversion includes the WLAN digital intermediate frequency signal and the digital control signal. The filtering submodule 4024 obtains the digital signal obtained through conversion performed by the analog-to-digital conversion submodule 4021, and performs filtering on the digital signal to obtain two channels of the signal. One channel of the signal is the WLAN digital intermediate frequency signal, and the other channel of the signal is the digital control signal. The intermediate frequency processing submodule 4022 processes the WLAN digital intermediate frequency signal into the WLAN digital baseband signal, the digital-to-analog conversion module converts the WLAN digital baseband signal into the WLAN analog baseband signal, and the sending module 404 sends the WLAN analog baseband signal to the radio frequency chip. The obtaining submodule 4023 obtains the control information from the other channel of the digital control signal, and then the sending module 404 sends the control information to the radio frequency chip.

Optionally, the analog-to-digital conversion submodule 4021 may include a band-pass filter/high-pass filter and a low-pass filter. The band-pass filter/high-pass filter performs filtering on the digital signal to obtain the WLAN digital intermediate frequency signal. The low-pass filter performs filtering on the digital signal to obtain the digital control signal.

Optionally, the low noise amplification module 405 performs low noise amplification on the analog signal received by the receiving module 401, to obtain the analog signal on which low noise amplification is performed. Then, the analog-to-digital conversion submodule 4021 converts, into the digital signal, the analog signal on which low noise amplification is performed.

In the foregoing embodiments, the signal processing chip 400 may be connected to an interface such as an HSI interface or an SPI interface of the radio frequency chip, so that the sending module 404 sends the control information and/or the WLAN analog baseband signal to the radio frequency chip.

Figure 10:
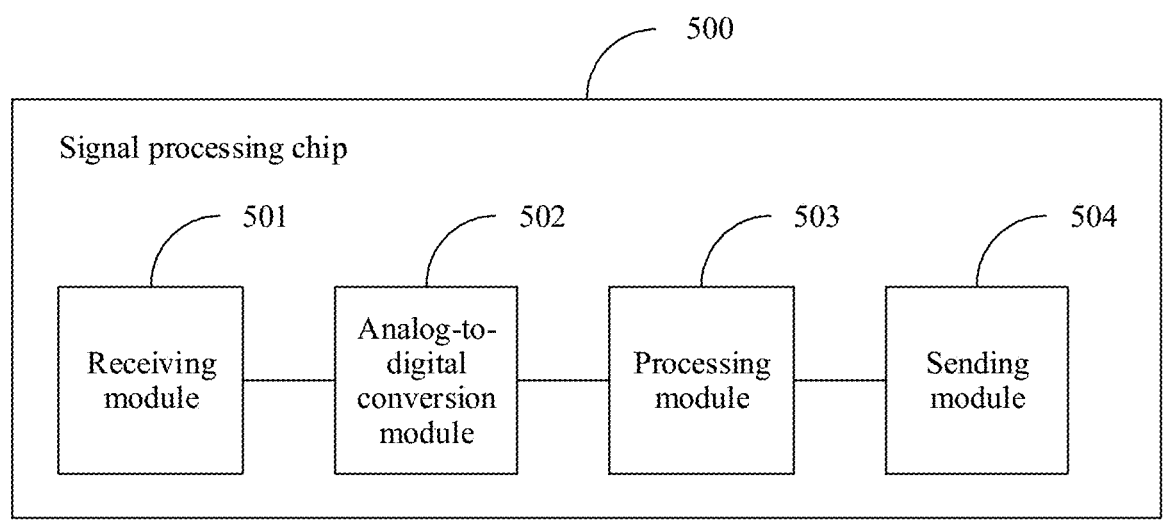
FIG. 10 is a schematic structural diagram of a signal processing chip according to another embodiment.

FIG. 10 is a schematic structural diagram of a signal processing chip according to another embodiment. As shown in FIG. 10, during application, a signal processing chip 500 in this embodiment may be included in the radio frequency processing apparatus in the AP shown in FIG. 2, and the radio frequency processing apparatus further includes a radio frequency chip. This embodiment is described from a perspective of a WLAN uplink direction. The signal processing chip 500 in this embodiment may include a receiving module 501, an analog-to-digital conversion module 502, a processing module 503, and a sending module 504.

In a first possible implementation, the receiving module 501 is configured to receive a WLAN analog baseband signal from the radio frequency chip.

The analog-to-digital conversion module 502 is configured to convert the WLAN analog baseband signal into a WLAN digital baseband signal.

The processing module 503 is configured to process the WLAN digital baseband signal into a WLAN analog intermediate frequency signal.

The sending module 504 is configured to send the WLAN analog intermediate frequency signal to a baseband processing apparatus.

In this embodiment, an antenna receives a WLAN signal from an air interface, and outputs the WLAN signal to the radio frequency chip in the radio frequency processing apparatus. The radio frequency chip processes the WLAN signal from the antenna into a WLAN analog baseband signal. Then, the radio frequency chip sends the WLAN analog baseband signal to the signal processing chip 500. The radio frequency chip may be a WLAN radio frequency chip. Correspondingly, the receiving module 501 in the signal processing chip 500 may receive the WLAN analog baseband signal, and the receiving module 501 may be, for example, a communications interface of the signal processing chip 500. The analog-to-digital conversion module 502 performs analog-to-digital conversion on the WLAN analog baseband signal received by the receiving module 501, to obtain the WLAN digital baseband signal. The analog-to-digital conversion module 502 may be, for example, an analog-to-digital converter of the signal processing chip 500. The processing module 503 processes, into the WLAN analog intermediate frequency signal, the WLAN digital baseband signal obtained through conversion performed by the analog-to-digital conversion module 502. The sending module 504 sends, to the baseband processing apparatus, the WLAN analog intermediate frequency signal obtained through processing performed by the processing module 503. A frequency band of the WLAN analog intermediate frequency signal is, for example, 20 MHz to 180 MHz.

Based on the foregoing solution, because the signal processing chip 500 sends the WLAN analog intermediate frequency signal to the baseband processing apparatus, the radio frequency processing apparatus including the signal processing chip 500 can be disposed remotely from the baseband processing apparatus. Therefore, the baseband processing apparatus is deployed in an equipment room at a near end, and communicates, in a wired manner, with the radio frequency processing apparatus deployed at a remote end, thereby reducing a volume and power consumption of a device deployed at the remote end. In addition, in this embodiment, the WLAN analog baseband signal from the radio frequency chip is first converted into the WLAN digital baseband signal, and then the baseband signal is processed into the intermediate frequency signal in a digital domain, to avoid generating a mirror signal in the frequency band of the WLAN analog intermediate frequency signal, and reduce interference.

In some embodiments, because the signal processing chip 500 sends the WLAN analog intermediate frequency signal to the baseband processing apparatus, the signal processing chip 500 and the baseband processing apparatus may be connected through a twisted pair or a coaxial cable. Correspondingly, the sending module 504 is further configured to send the WLAN analog intermediate frequency signal to the baseband processing apparatus through the twisted pair or the coaxial cable. Therefore, using the twisted pair or the coaxial cable for connection can effectively reduce costs.

In a second possible implementation, the processing module 503 is configured to obtain control information, generate a digital control signal based on the control information, and convert the digital control signal into an analog control signal.

The sending module 504 is further configured to send the analog control signal to the baseband processing apparatus.

In this embodiment, the processing module 503 obtains the control information and generate the digital control signal based on the control information. The processing module 503 (for example, a digital-to-analog conversion submodule in the processing module 503) may further convert the generated digital control signal into the analog control signal. Then, the sending module 504 sends the analog control signal to the baseband processing apparatus. The sending module 504 sends the analog control signal to the baseband processing apparatus in a wired manner (for example, through a twisted pair or a coaxial cable).

The control information may include at least one of the following: gain control information, cable length estimation information, and the like. This is not limited in this embodiment.

It should be noted that, an implementation related to the control information may be implemented independently from another embodiment, or may be implemented in combination with another embodiment.

It should be noted that the second possible implementation and the first possible implementation may be implemented independently, or the second possible implementation and the first possible implementation may be implemented in combination.

Figure 11:
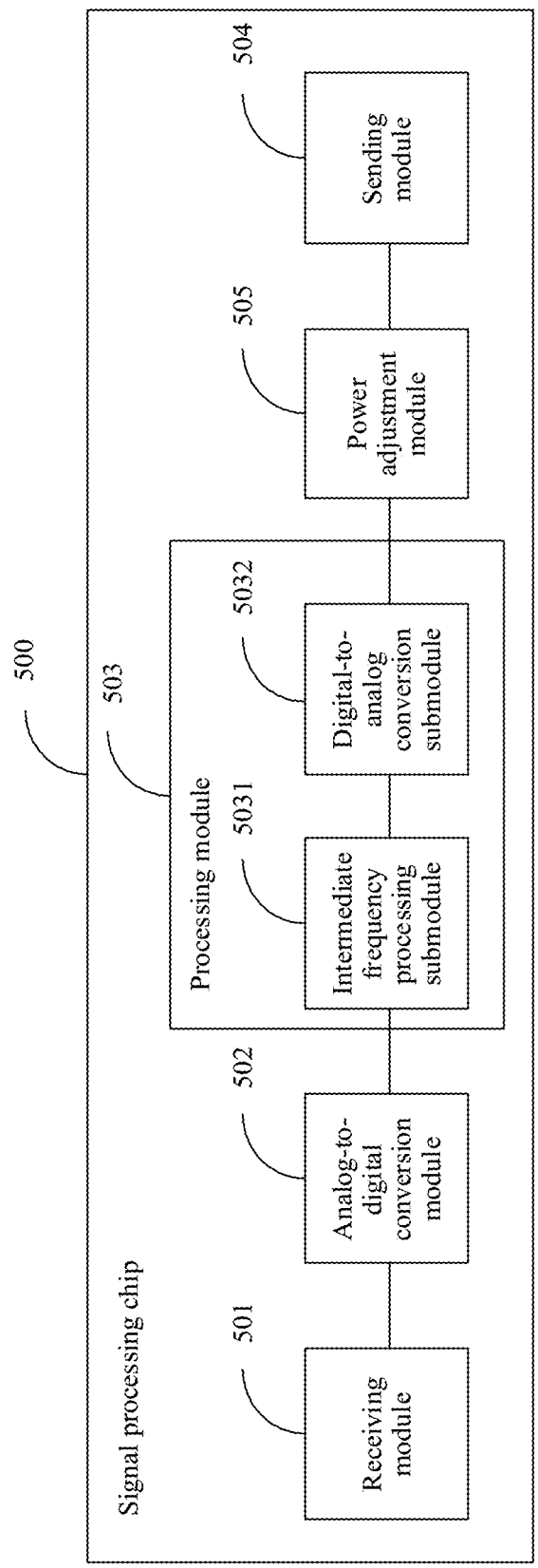
FIG. 11 is a schematic structural diagram of a signal processing chip according to another embodiment.

In some embodiments, as shown in FIG. 11, the processing module 503 may include an intermediate frequency processing submodule 5031 and a digital-to-analog conversion submodule 5032.

The intermediate frequency processing submodule 5031 is configured to process the WLAN digital baseband signal into a WLAN digital intermediate frequency signal.

The digital-to-analog conversion submodule 5032 is configured to convert the WLAN digital intermediate frequency signal into the WLAN analog intermediate frequency signal.

In some embodiments, the intermediate frequency processing submodule 5031 is further configured to perform digital up-conversion on the WLAN digital baseband signal, to obtain the WLAN digital intermediate frequency signal. Optionally, the intermediate frequency processing submodule 5031 is further configured to perform rate conversion, digital up-conversion, pre-equalization, and gain control processing on the WLAN digital baseband signal, to obtain the WLAN digital intermediate frequency signal.

Optionally, the signal processing chip 500 in this embodiment further includes a power adjustment module 505.

The power adjustment module 505 is configured to adjust power of the WLAN analog intermediate frequency signal before the WLAN analog intermediate frequency signal is sent.

The sending module 504 is further configured to send, to the baseband processing apparatus, a WLAN analog intermediate frequency signal whose power is adjusted.

For a specific implementation process of this embodiment, refer to a specific implementation process of the signal processing chip 300 shown in FIG. 4. Details are not described herein again.

Figure 12:
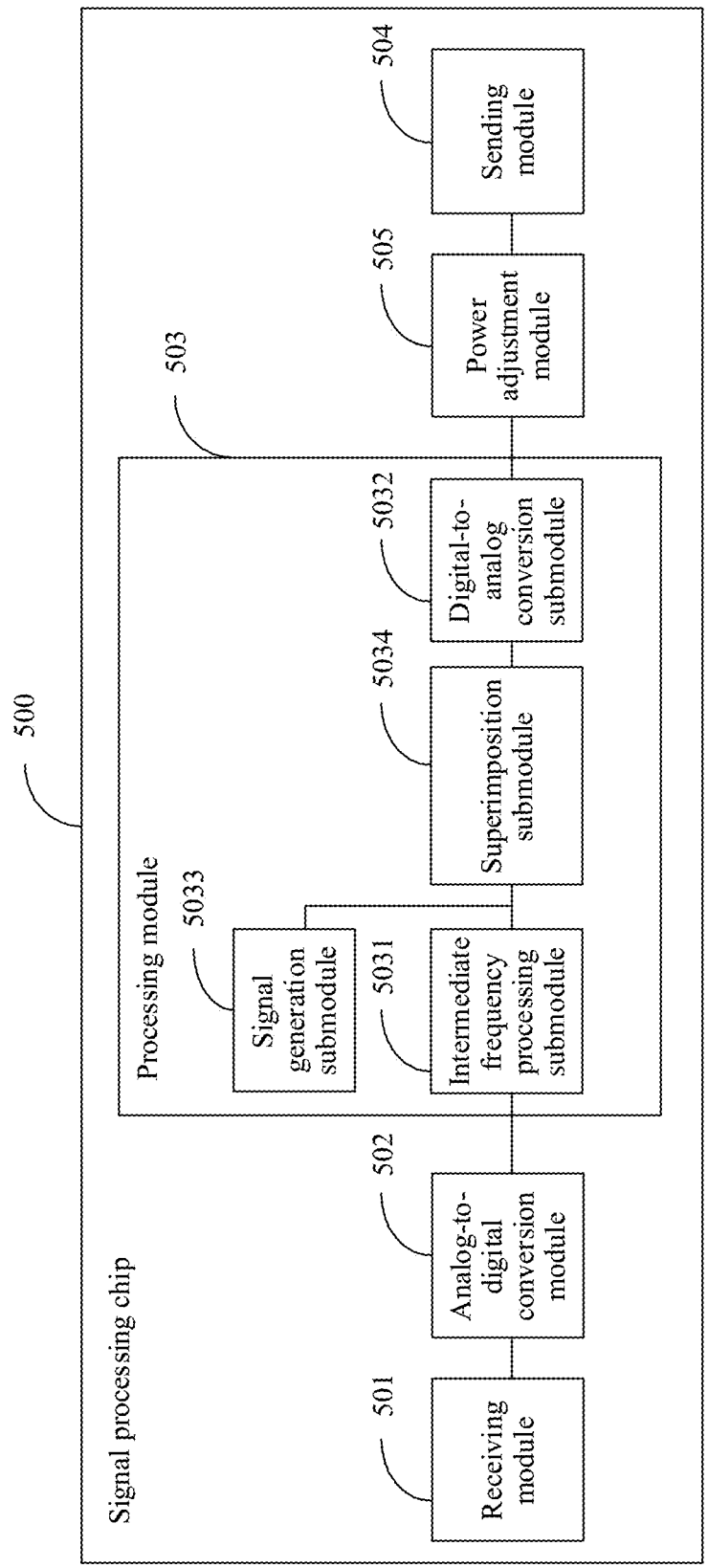
FIG. 12 is a schematic structural diagram of a signal processing chip according to another embodiment.

In some embodiments, as shown in FIG. 12, the processing module 503 in the signal processing chip 500 may further include a signal generation submodule 5033.

The signal generation submodule 5033 is configured to obtain control information and generate a digital control signal based on the control information.

The digital-to-analog conversion submodule 5032 is further configured to convert the digital control signal into an analog control signal.

The sending module 504 is further configured to send the analog control signal to the baseband processing apparatus.

In this embodiment, the signal generation submodule 5033 obtains the control information, generates the digital control signal based on the control information, and outputs the digital control signal to the digital-to-analog conversion submodule 5032 in the processing module 503, and the digital-to-analog conversion submodule 5032 may convert the digital control signal generated by the signal generation submodule 5033 into the analog control signal. Then, the sending module 504 sends the analog control signal to the radio frequency processing apparatus. The sending module 504 may send the analog control signal to the radio frequency processing apparatus in a wired manner (for example, through a twisted pair or a coaxial cable).

Optionally, before the sending module 504 sends the analog control signal, the power adjustment module 505 adjusts power of the analog control signal, and the sending module 504 sends an analog control signal whose power is adjusted.

In some embodiments, as shown in FIG. 12, the processing module 503 further includes a superimposition submodule 5034.

The superimposition submodule 5034 is configured to superimpose the digital control signal on the WLAN digital intermediate frequency signal, to obtain a superimposed digital signal.

The digital-to-analog conversion submodule 5032 is further configured to convert the superimposed digital signal into an analog signal, where the analog signal includes the analog control signal and the WLAN analog intermediate frequency signal.

The sending module 504 is further configured to send the analog signal to the baseband processing apparatus.

In this embodiment, after the signal generation submodule 5033 generates the digital control signal, the superimposition submodule 5034 in the processing module 503 obtains both the WLAN digital intermediate frequency signal from the intermediate frequency processing submodule 5031 and the digital control signal from the signal generation submodule 5033, and superimposes the WLAN digital intermediate frequency signal on the digital control signal, to obtain the superimposed digital signal. Then, the digital-to-analog conversion submodule 5032 obtains the superimposition digital signal from the superimposed submodule 5034, and performs digital-to-analog conversion on the superimposed digital signal, to obtain the analog signal, where the analog signal includes the analog control signal and the WLAN analog intermediate frequency signal. Then, the sending module 504 sends the analog signal to the baseband processing apparatus. The sending module 504 may send the analog control signal to the baseband processing apparatus in a wired manner (for example, through a twisted pair or a coaxial cable).

Optionally, before the sending module 504 sends the analog signal, the power adjustment module 505 adjusts power of the analog signal, and the sending module 504 sends an analog signal whose power is adjusted.

In the foregoing embodiments, the signal processing chip 500 may be connected to an interface such as an HSI interface or an SPI interface of the radio frequency chip, so that the receiving module 501 receives the control information and/or the WLAN analog baseband signal from the radio frequency chip.

Figure 13:
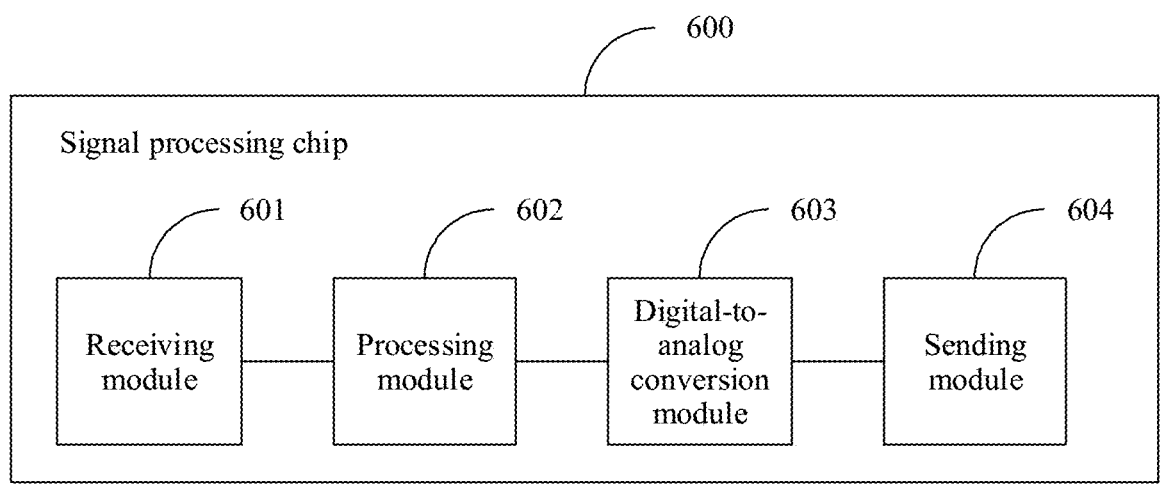
FIG. 13 is a schematic structural diagram of a signal processing chip according to another embodiment.

FIG. 13 is a schematic diagram of a signal processing chip according to another embodiment. As shown in FIG. 13, during application, a signal processing chip 600 in this embodiment may be included in the baseband processing apparatus in the AP shown in FIG. 2, and the baseband processing apparatus further includes a baseband chip. This embodiment is described from a perspective of a WLAN uplink direction. The signal processing chip 600 in this embodiment may include a receiving module 601, a processing module 602, a digital-to-analog conversion module 603, and a sending module 604.

In a first possible implementation, the receiving module 601 is configured to receive a WLAN analog intermediate frequency signal from a radio frequency processing apparatus.

The processing module 602 processes the WLAN analog intermediate frequency signal into a WLAN digital baseband signal.

The digital-to-analog conversion module 603 is configured to convert the WLAN digital baseband signal into a WLAN analog baseband signal.

The sending module 604 is configured to send the WLAN analog baseband signal to the baseband chip.

In this embodiment, the radio frequency processing apparatus sends the WLAN analog intermediate frequency signal to the signal processing chip 600, where a frequency band of the WLAN analog intermediate frequency signal is, for example, 20 MHz to 180 MHz. Correspondingly, the receiving module 601 in the signal processing chip 600 may receive the WLAN analog intermediate frequency signal, and the receiving module 601 may be, for example, a communications interface of the signal processing chip 600. The processing module 602 processes the WLAN analog intermediate frequency signal received by the receiving module 601 into the WLAN digital baseband signal. The digital-to-analog conversion module 603 performs digital-to-analog conversion on the WLAN digital baseband signal obtained through processing performed by the processing module 602, to obtain the WLAN analog baseband signal. The digital-to-analog conversion module 603 may be, for example, a digital-to-analog converter of the signal processing chip 600. The sending module 604 sends, to the baseband chip, the WLAN analog baseband signal obtained by the digital-to-analog conversion module 603. After obtaining the WLAN analog baseband signal, the baseband chip performs corresponding baseband processing on the WLAN analog baseband signal.

Based on the foregoing solution, because the signal processing chip 600 receives the WLAN analog intermediate frequency signal sent by the radio frequency processing apparatus, the baseband processing apparatus including the signal processing chip 600 can be disposed remotely from the radio frequency processing apparatus. Therefore, the baseband processing apparatus is deployed in an equipment room at a near end, and communicates, in a wired manner, with the radio frequency processing apparatus deployed at a remote end, thereby reducing a volume and power consumption of a device deployed at the remote end. In addition, in this embodiment, the WLAN analog intermediate frequency signal from the radio frequency processing apparatus is first processed into the WLAN digital baseband signal, and then the WLAN digital baseband signal is converted into the WLAN analog baseband signal. In this embodiment, the baseband signal is first obtained in a digital domain, to avoid generating a mirror signal, and reduce interference.

In some embodiments, because the signal processing chip 600 receives the WLAN analog intermediate frequency signal from the radio frequency processing apparatus, the signal processing chip 600 and the radio frequency processing apparatus may be connected through a twisted pair or a coaxial cable. Correspondingly, the receiving module 601 is further configured to receive the WLAN analog intermediate frequency signal through the twisted pair or the coaxial cable. Therefore, using the twisted pair or the coaxial cable for connection can effectively reduce costs.

In a second possible implementation, the receiving module 601 is configured to receive an analog control signal from the radio frequency processing apparatus.

The processing module 602 is configured to convert the analog control signal into a digital control signal and obtain control information from the digital control signal.

The processing module 602 is further configured to process the WLAN digital intermediate frequency signal into the WLAN digital baseband signal based on the control information.

In this embodiment, the radio frequency processing apparatus further sends the analog control signal to the signal processing chip 600. Correspondingly, the receiving module 601 in the signal processing chip 600 receives the analog control signal. The processing module 602 (for example, an analog-to-digital conversion submodule in the processing module 602) performs analog-to-digital conversion on the analog control signal received by the receiving module 601, to obtain the digital control signal. The processing module 602 obtains the control information from the digital control signal. The receiving module 601 may receive the analog control signal in a wired manner (for example, a network cable).

It should be noted that the second possible implementation and the first possible implementation may be implemented independently, or the second possible implementation and the first possible implementation may be implemented in combination.

If the first possible implementation and the second possible implementation are implemented in combination, a possible implementation in which the processing module 602 processes the WLAN analog intermediate frequency signal into the WLAN digital baseband signal is: processing the WLAN digital intermediate frequency signal into the WLAN digital baseband signal based on the control information. That is, after obtaining the control information, the processing module 602 processes the WLAN digital intermediate frequency signal into the WLAN digital baseband signal based on the control information.

Figure 14:
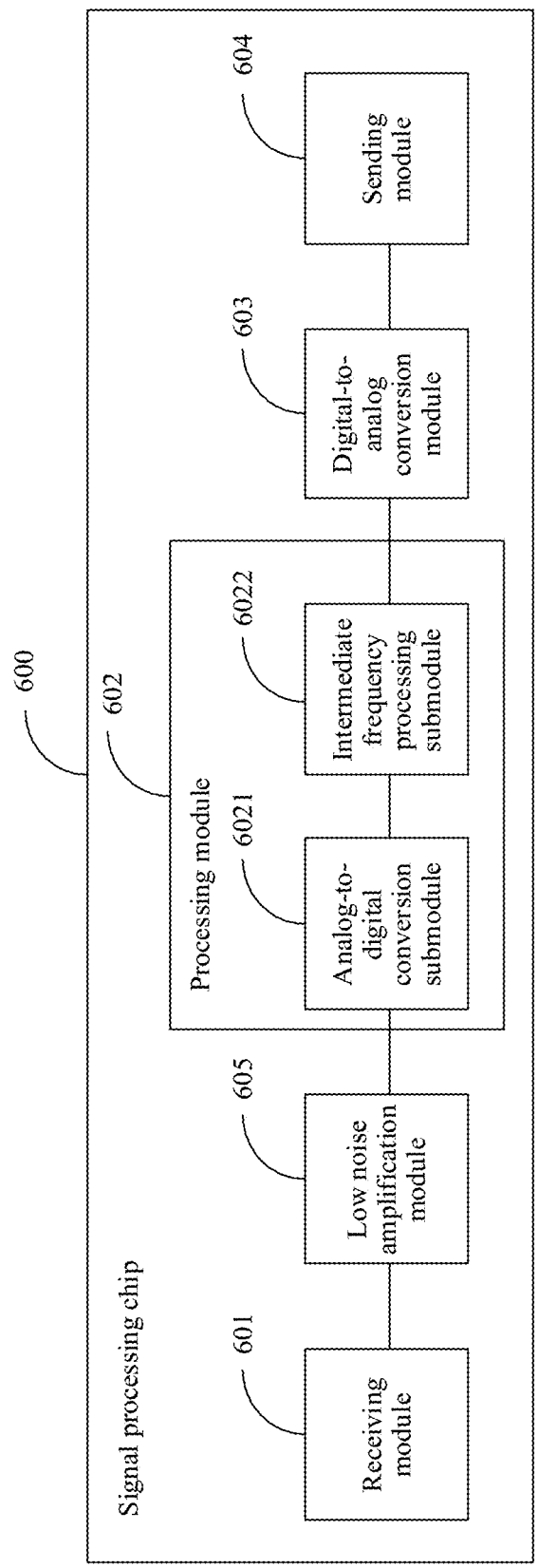
FIG. 14 is a schematic structural diagram of a signal processing chip according to another embodiment.

In some embodiments, as shown in FIG. 14, the processing module 602 may include an analog-to-digital conversion submodule 6021 and an intermediate frequency processing submodule 6022.

The analog-to-digital conversion submodule 6021 is configured to convert the WLAN analog intermediate frequency signal into the WLAN digital intermediate frequency signal.

The intermediate frequency processing submodule 6022 is configured to process the WLAN digital intermediate frequency signal into the WLAN digital baseband signal.

In some embodiments, the intermediate frequency processing submodule 6022 is further configured to perform digital down-conversion and filtering on the WLAN digital intermediate frequency signal, to obtain the WLAN digital baseband signal. Optionally, the intermediate frequency processing submodule 6022 is further configured to perform digital down-conversion, filtering, and rate conversion on the WLAN digital intermediate frequency signal, to obtain the WLAN digital baseband signal.

Optionally, the signal processing chip 600 further includes a low noise amplification module 605.

The low noise amplification module 605 is configured to perform low noise amplification on the WLAN analog intermediate frequency signal before the WLAN analog intermediate frequency signal is processed into the WLAN digital baseband signal.

The processing module 602 is further configured to process, into the WLAN digital baseband signal, the WLAN analog intermediate frequency signal on which low noise amplification is performed.

For a specific implementation process of this embodiment, refer to a specific implementation process of the signal processing chip 400 shown in FIG. 8. Details are not described herein again.

Figure 15:
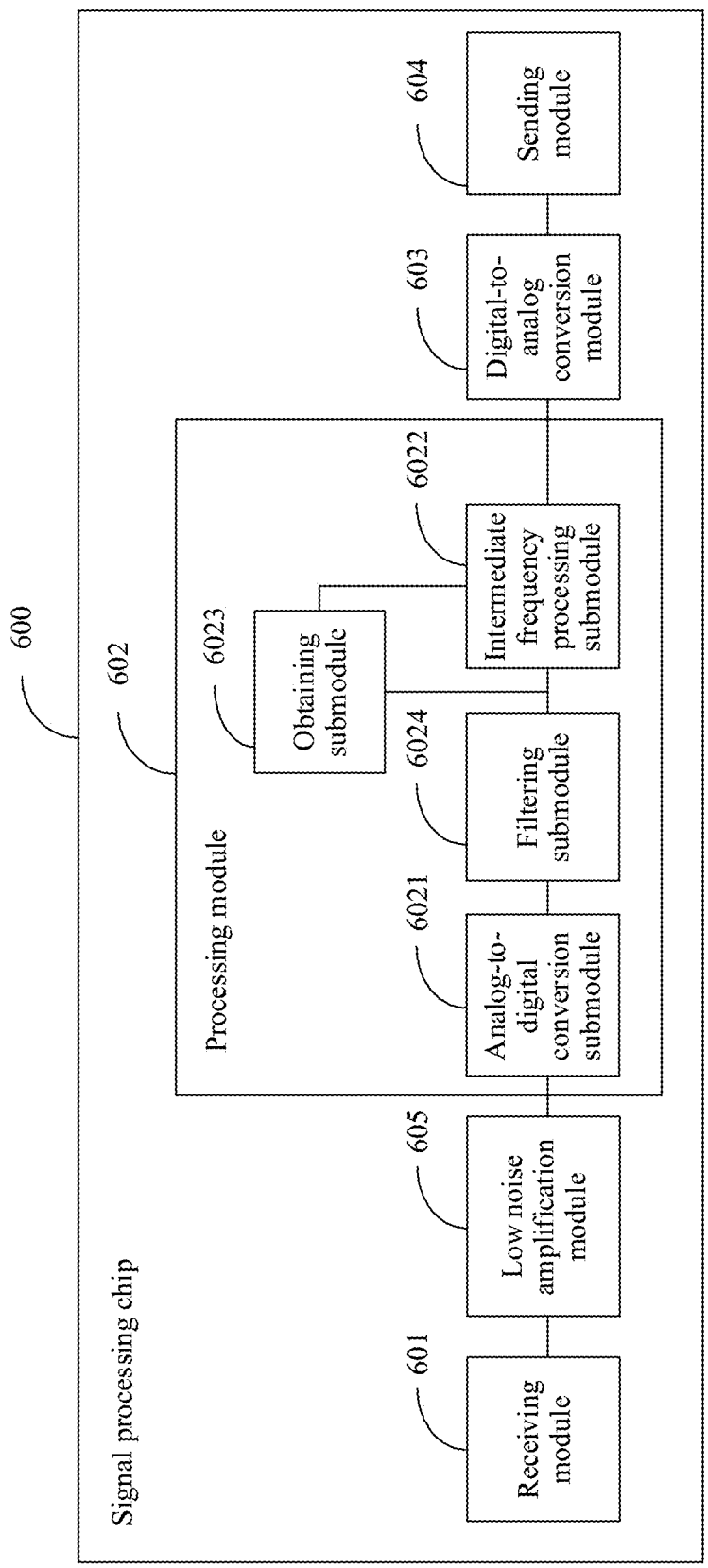
FIG. 15 is a schematic structural diagram of a signal processing chip according to another embodiment.

In some embodiments, as shown in FIG. 15, the processing module 602 in the signal processing chip 600 may further include an obtaining submodule 6023.

The receiving module 601 is further configured to receive the analog control signal from the radio frequency processing apparatus.

The analog-to-digital conversion submodule 6021 is further configured to convert the analog control signal into the digital control signal.

The obtaining submodule 6023 is configured to obtain the control information from the digital control signal.

The intermediate frequency processing submodule 6022 is further configured to process the WLAN digital intermediate frequency signal into the WLAN digital baseband signal based on the control information.

In this embodiment, the radio frequency processing apparatus further sends the analog control signal to the signal processing chip 600. Correspondingly, the receiving module 601 in the signal processing chip 600 receives the analog control signal. The analog-to-digital conversion submodule 6021 in the processing module 602 performs analog-to-digital conversion on the analog control signal received by the receiving module 601, to obtain the digital control signal. The obtaining submodule 6023 obtains the control information from the digital control signal obtained by the analog-to-digital conversion submodule 6021, and outputs the control information to the intermediate frequency processing submodule 6022 in the processing module 602. Then, the intermediate frequency processing submodule 6022 processes the WLAN digital intermediate frequency signal into the WLAN digital baseband signal based on the control information. The receiving module 601 receives the analog control signal in a wired manner (for example, through a twisted pair or a coaxial cable).

In some embodiments, as shown in FIG. 15, the processing module 602 may further include a filtering submodule 6024.

The receiving module 601 is further configured to receive an analog signal, where the analog signal includes the analog control signal and the WLAN analog intermediate frequency signal.

The analog-to-digital conversion submodule 6021 is further configured to convert the analog signal into a digital signal, where the digital signal includes the digital control signal and the WLAN digital intermediate frequency signal.

The filtering submodule 6024 is configured to perform filtering on the digital signal to obtain the digital control signal and the WLAN digital intermediate frequency signal.

In this embodiment, the receiving module 601 receives the analog signal from the radio frequency processing apparatus. The analog signal includes the WLAN analog intermediate frequency signal and the analog control signal. The analog-to-digital conversion submodule 6021 performs analog-to-digital conversion on the analog signal received by the receiving module 601, to obtain the digital signal. The analog signal includes the WLAN analog intermediate frequency signal and the analog control signal, and the digital signal obtained through analog-to-digital conversion includes the WLAN digital intermediate frequency signal and the digital control signal. The filtering submodule 6024 obtains the digital signal obtained through conversion performed by the analog-to-digital conversion submodule 6021, and performs filtering on the digital signal to obtain two channels of the signal. One channel of the signal is the WLAN digital intermediate frequency signal, and the other channel of the signal is the digital control signal. The WLAN digital intermediate frequency signal is processed by the intermediate frequency processing submodule 6022, and the digital control signal is processed by the obtaining submodule 6023.

Optionally, the analog-to-digital conversion submodule 6021 may include a band-pass filter/high-pass filter and a low-pass filter. The band-pass filter/high-pass filter performs filtering on the digital signal to obtain the WLAN digital intermediate frequency signal. The low-pass filter performs filtering on the digital signal to obtain the digital control signal.

Optionally, the low noise amplification module 605 performs low noise amplification on the analog signal received by the receiving module 601, to obtain the analog signal on which low noise amplification is performed. Then, the analog-to-digital conversion submodule 6021 converts, into the digital signal, the analog signal on which low noise amplification is performed.

In some embodiments, if the control information includes cable length estimation information, the cable length estimation information is used to perform pre-equalization. For example, the cable length estimation information is used to select a proper pre-equalization filter to perform pre-equalization.

In some embodiments, if the control information includes gain control information, the processing module 602 performs linearization processing on the WLAN digital baseband signal based on the gain control information.

In the foregoing embodiments, the signal processing chip 600 may be connected to an interface such as an HSI interface, an SPI interface, or a GPIO interface of the baseband chip, so that the sending module 604 sends the WLAN digital baseband signal to the baseband chip.

Figure 16:
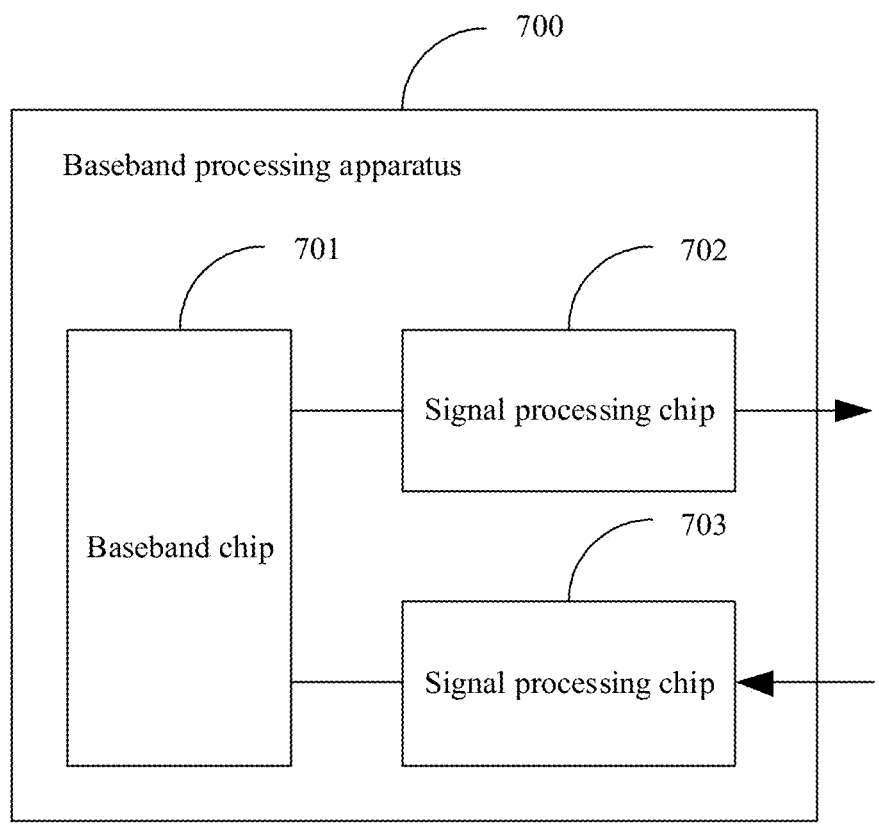
FIG. 16 is a schematic structural diagram of a baseband processing apparatus according to an embodiment.

FIG. 16 is a schematic structural diagram of a baseband processing apparatus according to an embodiment. As shown in FIG. 16, a baseband processing apparatus 700 in this embodiment includes a baseband chip 701, a signal processing chip 702, and a signal processing chip 703. It should be noted that, in a product form, the signal processing chip 702 may be used as a module inside the baseband chip, or may be a chip externally connected to the baseband chip. In a product form, the signal processing chip 703 may be used as a module inside the baseband chip, or may be a chip externally connected to the baseband chip.

In an implementation, the signal processing chip 702 may use a structure shown in any one of the apparatus embodiments in FIG. 3, FIG. 4, and FIG. 6. Implementation principles and technical effects of the chip are similar, and details are not described herein again.

In another implementation, the signal processing chip 703 may use a structure shown in any one of the apparatus embodiments in FIG. 13 to FIG. 15. Implementation principles and technical effects of the chip are similar, and details are not described herein again.

In another implementation, the signal processing chip 702 may use a structure shown in any one of the apparatus embodiments in FIG. 3, FIG. 4, and FIG. 6. Implementation principles and technical effects of the chip are similar, and details are not described herein again. The signal processing chip 703 may use a structure shown in any one of the apparatus embodiments in FIG. 13 to FIG. 15. Implementation principles and technical effects of the chip are similar, and details are not described herein again.

In some embodiments, the signal processing chip 702 and the signal processing chip 703 may be integrated into a same signal processing chip.

Figure 17:
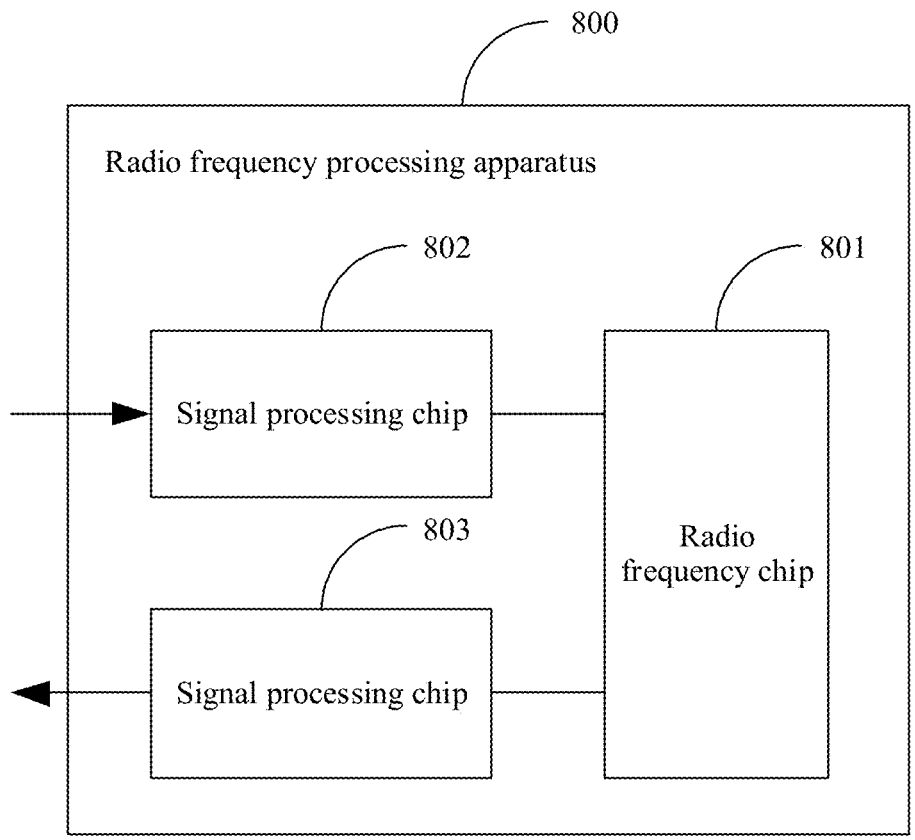
FIG. 17 is a schematic structural diagram of a radio frequency processing apparatus according to an embodiment.

FIG. 17 is a schematic structural diagram of a radio frequency processing apparatus according to an embodiment. As shown in FIG. 17, a radio frequency processing apparatus 800 in this embodiment includes a radio frequency chip 801, a signal processing chip 802, and a signal processing chip 803. It should be noted that, in a product form, the signal processing chip 802 may be used as a module inside the radio frequency chip, or may be a chip externally connected to the radio frequency chip. In a product form, the signal processing chip 803 may be used as a module inside the radio frequency chip, or may be a chip externally connected to the radio frequency chip.

In an implementation, the signal processing chip 802 may use a structure shown in any one of the apparatus embodiments in FIG. 7 to FIG. 9. Implementation principles and technical effects of the chip are similar, and details are not described herein again.

In another implementation, the signal processing chip 803 may use a structure shown in any one of the apparatus embodiments in FIG. 10 to FIG. 12. Implementation principles and technical effects of the chip are similar, and details are not described herein again.

In another implementation, the signal processing chip 802 may use a structure shown in any one of the apparatus embodiments in FIG. 7 to FIG. 9. Implementation principles and technical effects of the chip are similar, and details are not described herein again. The signal processing chip 803 may use a structure shown in any one of the apparatus embodiments in FIG. 10 to FIG. 12. Implementation principles and technical effects of the chip are similar, and details are not described herein again.

In some embodiments, the signal processing chip 802 and the signal processing chip 803 may be integrated into a same signal processing chip.

Figure 18:
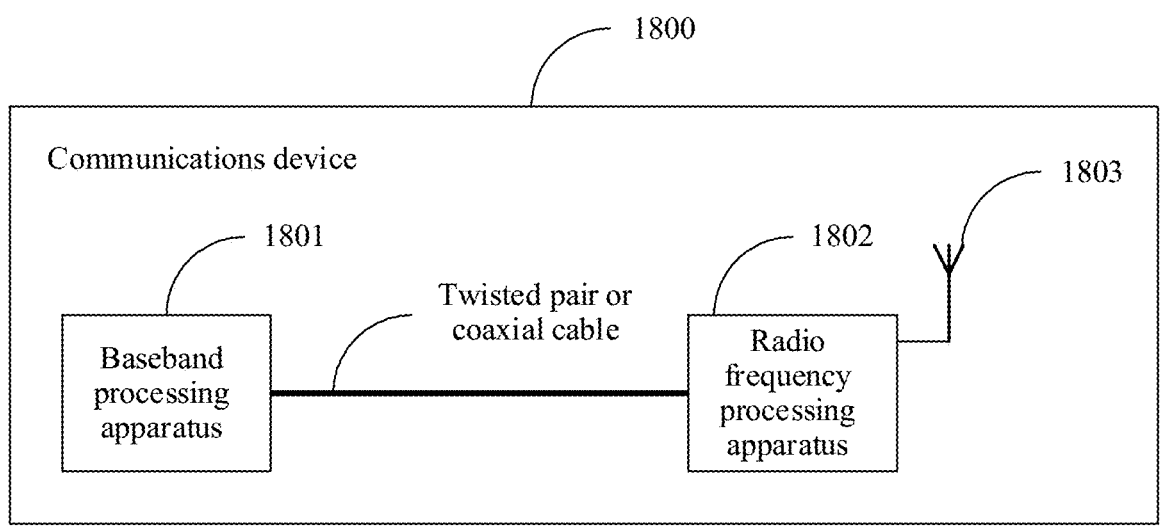
FIG. 18 is a schematic structural diagram of a communications device according to an embodiment.

FIG. 18 is a schematic structural diagram of a communications device according to an embodiment. As shown in FIG. 18, a communications device 1800 in this embodiment includes a baseband processing apparatus 1801, a radio frequency processing apparatus 1802, and an antenna 1803.

For the baseband processing apparatus 1801, refer to a structure shown in the apparatus embodiment in FIG. 16. Implementation principles and technical effects of the apparatus are similar, and details are not described herein again.

For the radio frequency processing apparatus 1802, refer to a structure shown in the apparatus embodiment in FIG. 17. Implementation principles and technical effects of the apparatus are similar, and details are not described herein again.

The antenna is configured to send a WLAN radio frequency signal, or receive a WLAN radio frequency signal.

Optionally, the baseband processing apparatus 1801 and the radio frequency processing apparatus 1802 may be connected through a twisted pair or a coaxial cable.

The embodiments in this specification are all described in a progressive manner. For same or similar parts in the embodiments, refer to these embodiments, and each embodiment focuses on a difference from another embodiment. Especially, a method embodiment is basically similar to a product embodiment, and therefore is described briefly. For related parts, refer to descriptions in the product embodiment part.

The units described as separate parts may or may not be physically separate. Parts displayed as units may be or may not be physical units. That is, the parts may be located in one position, or may be distributed on a plurality of network units. Some or all of the units may be selected based on actual requirements to achieve the objectives of the solutions of the embodiments.

In addition, functional units may be integrated into one processing unit, or each of the units may exist alone physically, or two or more units are integrated into one unit. The integrated unit may be implemented in a form of hardware, or may be implemented in a form of a combination of hardware and software.

In summary, it should be noted that the foregoing descriptions are merely exemplary embodiments of the technical solutions, but are not intended to limit the protection scope of this disclosure. It is clear that a person skilled in the art can make various modifications and variations without departing from the scope of this disclosure. If the modifications and variations fall within the scope defined by the claims and their equivalent technologies, any modification, equivalent replacement, and improvement made shall fall within the protection scope of this disclosure.

What is claimed is:

1. An apparatus, comprising:
a receiver configured to receive a wireless local area network (WLAN) analog baseband signal from a baseband chip;
an analog-to-digital converter (ADC) coupled to the receiver and configured to convert the WLAN analog baseband signal into a WLAN digital baseband signal;
one or more processors coupled to the ADC and configured to:
select, based on control information, a pre-equalization filter, wherein the pre-equalization filter is configured to compensate for wired transmission attenuation in a frequency domain; and
process the WLAN digital baseband signal to obtain a WLAN analog intermediate frequency signal by performing, using the pre-equalization filter and based on cable length estimation information of a cable, pre-equalization on the WLAN digital baseband signal to compensate for the wired transmission attenuation by ensuring that a signal-to-noise ratio (SNR) of each signal in a frequency band meets a requirement; and
a transmitter coupled to the one or more processors and configured to:
communicatively couple to a radio frequency processing apparatus disposed remotely from the apparatus through a wired connection between the apparatus and the radio frequency processing apparatus; and
send the WLAN analog intermediate frequency signal to the radio frequency processing apparatus through the wired connection between the apparatus and the radio frequency processing apparatus.

2. The apparatus of claim 1, wherein the one or more processors comprise:
an intermediate frequency processor configured to process the WLAN digital baseband signal to obtain a WLAN digital intermediate frequency signal; and
a digital-to-analog converter (DAC) coupled to the intermediate frequency processor and configured to convert the WLAN digital intermediate frequency signal into the WLAN analog intermediate frequency signal.

3. The apparatus of claim 2, wherein the intermediate frequency processor is further configured to further process the WLAN digital baseband signal by performing digital up-conversion and at least one of rate conversion or gain control processing.

4. The apparatus of claim 2, wherein the receiver is further configured to receive the control information from the baseband chip, wherein the one or more processors further comprise a signal generator configured to generate a digital control signal based on the control information, wherein the DAC is further configured to convert the digital control signal into an analog control signal, and wherein the transmitter is further configured to send the analog control signal to the radio frequency processing apparatus.

5. The apparatus of claim 4, wherein the one or more processors further comprise a superimposer configured to superimpose the digital control signal on the WLAN digital intermediate frequency signal to obtain a superimposed digital signal, wherein the DAC is further configured to convert the superimposed digital signal into an analog signal, wherein the analog signal comprises the analog control signal and the WLAN analog intermediate frequency signal, and wherein the transmitter is further configured to send the analog signal to the radio frequency processing apparatus.

6. The apparatus of claim 1, wherein the receiver is further configured to receive the control information from the baseband chip, wherein the one or more processors are further configured to generate a digital control signal based on the control information and convert the digital control signal into an analog control signal, and wherein the transmitter is further configured to send the analog control signal to the radio frequency processing apparatus.

7. The apparatus of claim 1, further comprising a power adjuster configured to adjust a power of the WLAN analog intermediate frequency signal to obtain an adjusted WLAN analog intermediate frequency signal, and wherein the transmitter is further configured to send the adjusted WLAN analog intermediate frequency signal to the radio frequency processing apparatus.

8. The apparatus of claim 1, wherein the wired connection between the apparatus and the radio frequency processing apparatus comprises a twisted pair or a coaxial cable, and wherein the transmitter is further configured to send the WLAN analog intermediate frequency signal to the radio frequency processing apparatus through the twisted pair or the coaxial cable.

9. An apparatus, comprising:
a receiver configured to receive a wireless local area network (WLAN) analog intermediate frequency signal from a baseband processing apparatus;
one or more processors coupled to the receiver and configured to process the WLAN analog intermediate frequency signal to obtain a WLAN digital baseband signal;
a digital-to-analog converter (DAC) coupled to the one or more processors and configured to:
select, based on control information, a pre-equalization filter, wherein the pre-equalization filter is configured to compensate for wired transmission attenuation in a frequency domain; and
convert the WLAN digital baseband signal into a WLAN analog baseband signal by performing, using the pre-equalization filter and based on cable length estimation information of a cable, pre-equalization on the WLAN digital baseband signal to compensate for the wired transmission attenuation by ensuring that a signal-to-noise ratio (SNR) of each signal in a frequency band meets a requirement; and
a transmitter coupled to the DAC and configured to:
communicatively couple to a radio frequency chip disposed remotely from the apparatus through a wired connection between the apparatus and the radio frequency chip; and
send the WLAN analog baseband signal to the radio frequency chip through the wired connection between the apparatus and the radio frequency chip.

10. The apparatus of claim 9, wherein the one or more processors comprise:
an analog-to-digital converter (ADC) configured to convert the WLAN analog intermediate frequency signal into a WLAN digital intermediate frequency signal; and
an intermediate frequency processor configured to process the WLAN digital intermediate frequency signal to obtain the WLAN digital baseband signal.

11. The apparatus of claim 10, wherein the intermediate frequency processor is further configured to further process the WLAN digital intermediate frequency signal by performing digital down-conversion and filtering.

12. The apparatus of claim 10, wherein the receiver is further configured to receive an analog control signal from the baseband processing apparatus, wherein the ADC is further configured to convert the analog control signal into a digital control signal, wherein the one or more processors further comprise an obtainer configured to obtain the control information from the digital control signal, and wherein the transmitter is further configured to send the control information to the radio frequency chip.

13. The apparatus of claim 12, wherein the receiver is further configured to receive an analog signal, wherein the analog signal comprises the analog control signal and the WLAN analog intermediate frequency signal, wherein the ADC is further configured to convert the analog signal into a digital signal, wherein the digital signal comprises the digital control signal and the WLAN digital intermediate frequency signal, and wherein the one or more processors further comprise a filter configured to filter the digital signal to obtain the digital control signal and the WLAN digital intermediate frequency signal.

14. The apparatus of claim 9, wherein the receiver is further configured to receive an analog control signal from the baseband processing apparatus, wherein the one or more processors are further configured to convert the analog control signal into a digital control signal and obtain the control information from the digital control signal, and wherein the transmitter is further configured to send the control information to the radio frequency chip.

15. The apparatus of claim 9, further comprising a low-noise amplifier configured to perform low-noise amplification on the WLAN analog intermediate frequency signal to obtain an amplified WLAN analog intermediate frequency signal, and wherein the one or more processors are further configured to generate the WLAN digital baseband signal based on the amplified WLAN analog intermediate frequency signal.

16. The apparatus of claim 9, wherein the wired connection between the apparatus and the radio frequency chip comprises a twisted pair or a coaxial cable, and wherein the receiver is further configured to receive the WLAN analog intermediate frequency signal through the twisted pair or the coaxial cable.

17. An apparatus, comprising:
a baseband processing apparatus comprising:
a baseband chip configured to pass a wireless local area network (WLAN) analog baseband signal; and
a first signal processing chip comprising:
a first receiver configured to receive the WLAN analog baseband signal from the baseband chip;
an analog-to-digital converter (ADC) configured to convert the WLAN analog baseband signal into a first WLAN digital baseband signal;
one or more first processors configured to:
select, based on control information, a pre-equalization filter, wherein the pre-equalization filter is configured to compensate for wired transmission attenuation in a frequency domain; and
process the first WLAN digital baseband signal to obtain a WLAN analog intermediate frequency signal by performing, using the pre-equalization filter and based on cable length estimation information of a cable, pre-equalization on the WLAN digital baseband signal to compensate for the wired transmission attenuation by ensuring that a signal-to-noise ratio (SNR) of each signal in a frequency band meets a requirement; and
a first transmitter configured to:
communicatively couple to a radio frequency processing apparatus disposed remotely from the first signal processing chip through a wired connection between the first signal processing chip and the radio frequency processing apparatus; and
send the WLAN analog intermediate frequency signal to the radio frequency processing apparatus through the wired connection between the first signal processing chip and the radio frequency processing apparatus;
the radio frequency processing apparatus connected to the baseband processing apparatus and comprising:
a second signal processing chip comprising:
a second receiver configured to receive the WLAN analog intermediate frequency signal from the first transmitter;
one or more second processors configured to process the WLAN analog intermediate frequency signal to obtain a second WLAN digital baseband signal;
a second digital-to-analog converter (DAC) configured to convert the second WLAN digital baseband signal into a WLAN analog baseband signal; and
a second transmitter configured to send the WLAN analog baseband signal;
a radio frequency chip configured to convert the WLAN analog baseband signal into a WLAN radio frequency signal; and
an antenna coupled to the radio frequency processing apparatus and configured to transmit the WLAN radio frequency signal.

18. The apparatus of claim 17, wherein the one or more first processors comprise:
an intermediate frequency processor configured to process the first WLAN digital baseband signal to obtain a WLAN digital intermediate frequency signal; and
a first DAC coupled to the intermediate frequency processor and configured to convert the WLAN digital intermediate frequency signal into the WLAN analog intermediate frequency signal.

19. The apparatus of claim 18, wherein the one or more first processors are further configured to further process the first WLAN digital baseband signal by performing digital up-conversion and at least one of rate conversion or gain control processing.

20. The apparatus of claim 17, wherein the wired connection between the first signal processing chip and the radio frequency processing apparatus comprises a twisted pair or a coaxial cable, and wherein the first transmitter is further configured to send the WLAN analog intermediate frequency signal to the radio frequency processing apparatus through the twisted pair or the coaxial cable.

* * * * *